United States Patent
Yuki

(10) Patent No.: US 11,927,452 B2
(45) Date of Patent: Mar. 12, 2024

(54) INFORMATION PROCESSING APPARATUS, INFORMATION PROCESSING METHOD, PROGRAM, AND INFORMATION PROCESSING SYSTEM

(71) Applicant: Sony Group Corporation, Tokyo (JP)

(72) Inventor: Taichi Yuki, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 119 days.

(21) Appl. No.: 17/621,253

(22) PCT Filed: May 22, 2020

(86) PCT No.: PCT/JP2020/020326
§ 371 (c)(1),
(2) Date: Dec. 21, 2021

(87) PCT Pub. No.: WO2021/019879
PCT Pub. Date: Feb. 4, 2021

(65) Prior Publication Data
US 2022/0412749 A1 Dec. 29, 2022

(30) Foreign Application Priority Data
Jul. 26, 2019 (JP) .................................. 2019-137780

(51) Int. Cl.
*G01C 21/34* (2006.01)
(52) U.S. Cl.
CPC .................................. *G01C 21/343* (2013.01)
(58) Field of Classification Search
CPC .. G01C 21/343; G08G 5/0013; G08G 5/0052; G08G 5/0069; G08G 5/0086; G08G 5/0039
See application file for complete search history.

(56) References Cited

U.S. PATENT DOCUMENTS

2004/0172191 A1* 9/2004 Vitikainen ......... G01C 21/3423
701/426
2014/0005924 A1* 1/2014 Letz .................... G01C 21/343
701/424
(Continued)

FOREIGN PATENT DOCUMENTS

CN 109035871 A 12/2018
JP 2007257276 A * 10/2007
(Continued)

OTHER PUBLICATIONS

International Search Report and Written Opinion dated Jul. 28, 2020, received for PCT Application PCT/JP2020/020326, Filed on May 22, 2020, 8 pages including English Translation.

*Primary Examiner* — Khoi H Tran
*Assistant Examiner* — Nhi Q Bui
(74) *Attorney, Agent, or Firm* — XSENSUS LLP

(57) ABSTRACT

An information processing apparatus according to an embodiment of the present technology includes an acquisition unit, a connection unit, and a smoothing unit. The acquisition unit acquires route information, the route information including a route including a plurality of positions and a state parameter relating to a moving state of a mobile body when the mobile body moves along the route, the state parameter being associated with each of the positions of the route. The connection unit connects a first route included in acquired first route information and a second route included in acquired second route information to each other. The smoothing unit smooths a difference between a first state parameter associated with a first smoothing point on the first route and a second state parameter associated with a second smoothing point on the second route.

20 Claims, 14 Drawing Sheets

(56) References Cited

U.S. PATENT DOCUMENTS

| | | | | |
|---|---|---|---|---|
| 2016/0210863 A1* | 7/2016 | Kohn-Rich | ............ | G05D 1/102 |
| 2017/0221368 A1* | 8/2017 | Zhang | .................. | G08G 5/0021 |
| 2019/0340938 A1* | 11/2019 | Aklilu | .................. | G08G 5/0021 |

FOREIGN PATENT DOCUMENTS

| | | | |
|---|---|---|---|
| JP | 2010-73080 | A | 4/2010 |
| JP | 2010-225139 | A | 10/2010 |
| JP | 6294487 | B2 | 3/2018 |

* cited by examiner

| | Airframe information | Date of movement | Time series data (position, velocity, etc.) |
|---|---|---|---|
| Route A | Airframe 1 | February 3<br>February 4 | Time 0.000 Position[x,y,z]=[100,200,300] Velocity[vx,vy,vz]=[0,0,0](m/s),···<br>Time 0.100 Position[x,y,z]=[101,201,300] Velocity[vx,vy,vz]=[0.1,0.2,0](m/s),···<br>. . |
| Route B | Airframe 1 | February 3 | Time 0.000 Position[x,y,z]=[200,200,300] Velocity[vx,vy,vz]=[0,0,0](m/s),··· |
| . . | . . | . . | . . |

FIG.3

| | Airframe performance |
|---|---|
| Airframe 1 | Maximum velocity[x,y,z]=[20,20,5](m/s) Maximum acceleration [x,y,z]=[5,5,2](m/s^2) Maximum deceleration[x,y,z]=[5,5,2](m/s^2) Angular velocity[x,y,z]=[3,3,1](rad/s)··· |
| Airframe 2 | Maximum velocity[x,y,z]=[30,30,8](m/s) Maximum acceleration [7,7,4](m/s^2) Maximum deceleration[6,6,2](m/s^2) Angular velocity [x,y,z]=[5,5,3](rad/s)··· |

FIG.4

INFORMATION PROCESSING APPARATUS, INFORMATION PROCESSING METHOD, PROGRAM, AND INFORMATION PROCESSING SYSTEM

CROSS-REFERENCE TO RELATED APPLICATIONS

The present application is based on PCT filing PCT/JP2020/020326, filed May 22, 2020, which claims priority to JP 2019-137780, filed on Jul. 26, 2019, the entire contents of each are incorporated herein by reference.

TECHNICAL FIELD

The present technology relates to an information processing apparatus, an information processing method, a program, and an information processing system that are applicable to control autonomous movement of a mobile body.

BACKGROUND ART

In the flight processing system described in Patent Literature 1, the flight data of an unmanned aerial vehicle is retrieved by a user. The flight data includes a flight route, a flight velocity, an image collection direction and image collection velocity of an image collection device mounted on the unmanned aerial vehicle, and the like. A preview image of the retrieved flight data in the flight route is presented to the user. By checking the preview image, the user can intuitively understand the information of the retrieved flight data and can easily select desired flight data.

Further, in the flight processing system described in Patent Literature 1, the unmanned aerial vehicle is controlled on the basis of the selected flight data, so that the flight data is easily reproduced ([0036] to [0045], [0066] to [0068], FIGS. 2 and 5, etc. of Patent Literatures 1).

CITATION LIST

Patent Literature

Patent Literature 1: Japanese Patent No. 6294487

DISCLOSURE OF INVENTION

Technical Problem

As described above, there is a need for a technique that makes it possible to easily create a moving route for a mobile body or the like capable of autonomously moving.

In view of the above circumstances, it is an object of the present technology to provide an information processing apparatus, an information processing method, a program, and an information processing system that are capable of easily creating a route for a mobile body capable of autonomously moving.

Solution to Problem

In order to achieve the above object, an information processing apparatus according to an embodiment of the present technology includes an acquisition unit, a connection unit, and a smoothing unit.

The acquisition unit acquires route information, the route information including a route including a plurality of positions and a state parameter relating to a moving state of a mobile body when the mobile body moves along the route, the state parameter being associated with each of the positions of the route.

The connection unit connects a first route included in acquired first route information and a second route included in acquired second route information to each other.

The smoothing unit smooths a difference between a first state parameter associated with a first smoothing point on the first route and a second state parameter associated with a second smoothing point on the second route.

In this information processing apparatus, the route information is acquired. The route information includes a route including a plurality of positions and a state parameter relating to a moving state of a mobile body when the mobile body moves along the route, the state parameter being associated with each position of the route. The first route included in the acquired first route information and the second route included in the acquired second route information are connected to each other. The difference between the first state parameter associated with the first smoothing point on the first route and the second state parameter associated with the second smoothing point on the second route is smoothed. As a result, it is possible to easily create a route for a mobile body capable of autonomously moving.

The smoothing unit may set the first smoothing point and the second smoothing point with reference to a connected point at which the first route and the second route are connected to each other.

The smoothing unit may set the connected point to at least one of the first smoothing point or the second smoothing point.

The information processing apparatus may further include a generation unit that generates route information in which a route and a state parameter are associated with each other, the route including the first route and the second route connected to each other, the state parameter including a result of the smoothing.

The state parameter relating to the moving state of the mobile body may include a velocity of the mobile body and a posture of the mobile body.

The acquisition unit may acquire performance information relating to performance of the mobile body. In this case, the smoothing unit may smooth the difference between the first state parameter and the second state parameter on the basis of the acquired performance information.

The performance information may include at least one of a maximum velocity of the mobile body, a maximum acceleration of the mobile body, a maximum deceleration of the mobile body, or a maximum angular velocity of the mobile body.

The information processing apparatus may further include a smoothing determination unit that determines whether or not the difference between the first state parameter and the second state parameter is to be smoothed.

The connection unit may connect an end point of the first route and a start point of the second route to each other. In this case, the smoothing determination unit may determine whether or not the difference between the first state parameter and the second state parameter is to be smoothed on the basis of a difference between the state parameter associated with the end point of the first route and the state parameter associated with the start point of the second route.

The acquisition unit may acquire performance information relating to moving performance of the mobile body. In this case, the determination unit may determine whether or not the difference between the first state parameter and the second state parameter is to be smoothed on the basis of the acquired performance information.

The information processing apparatus may further include a connection determination unit that determines easiness of connection with another route for each of the positions of the route included in the acquired route information.

The connection determination unit may determine the easiness of connection with the other route on the basis of the state parameter included in the acquired route information.

The information processing apparatus may further include a GUI generation unit that generates a graphical user interface (GUI) for inputting an instruction relating to connection of the route included in the route information.

The instruction relating to connection of the route may include an instruction to cut out a part of the route included in the route information, an instruction to duplicate the route or a part of the route, an instruction to connect the first route and the second route to each other, an instruction to set the first smoothing point and the second smoothing point, and an instruction to perform smoothing.

The information processing apparatus may further include a connection determination unit that determines easiness of connection with another route for each of the positions of the route included in the acquired route information. In this case, the GUI generation unit may generate the GUI including the route, in which a result of the determination by the connection determination unit is displayed in a distinguishable manner.

The information processing apparatus may further include an endpoint smoothing unit that performs endpoint smoothing for connection with another route on at least one of a start point or an end point of the route included in the acquired route information.

The endpoint smoothing unit may smooth a difference between the state parameter at an endpoint that is the start point or the end point and the state parameter at a position set with reference to the endpoint.

An information processing method according to an embodiment of the present technology is an information processing method executed by a computer system and including: acquiring route information, the route information including a route including a plurality of positions and a state parameter relating to a moving state of a mobile body when the mobile body moves along the route, the state parameter being associated with each of the positions of the route; connecting a first route included in acquired first route information and a second route included in acquired second route information to each other; and smoothing a difference between a first state parameter associated with a first smoothing point on the first route and a second state parameter associated with a second smoothing point on the second route.

A program according to an embodiment of the present technology causes a computer system to execute the steps of: acquiring route information, the route information including a route including a plurality of positions and a state parameter relating to a moving state of a mobile body when the mobile body moves along the route, the state parameter being associated with each of the positions of the route; connecting a first route included in acquired first route information and a second route included in acquired second route information to each other; and smoothing a difference between a first state parameter associated with a first smoothing point on the first route and a second state parameter associated with a second smoothing point on the second route.

An information processing system according to an embodiment of the present technology includes an information processing apparatus, a generation unit, and a mobile body.

The information processing apparatus includes an acquisition unit, a connection unit, and a smoothing unit.

The acquisition unit acquires route information, the route information including a route including a plurality of positions and a state parameter relating to a moving state of a mobile body when the mobile body moves along the route, the state parameter being associated with each of the positions of the route.

The connection unit connects a first route included in acquired first route information and a second route included in acquired second route information to each other.

The smoothing unit smooths a difference between a first state parameter associated with a first smoothing point on the first route and a second state parameter associated with a second smoothing point on the second route.

The generation unit generates route information in which a route and a state parameter are associated with each other, the route including the first route and the second route connected to each other, the state parameter including a result of the smoothing.

The mobile body is movable on the basis of the route information generated by the generation unit.

BRIEF DESCRIPTION OF DRAWINGS

FIG. 3 is a schematic diagram showing a configuration of a route information DB.

FIG. 4 is a schematic diagram showing a configuration of an airframe performance DB.

MODE(S) FOR CARRYING OUT THE INVENTION

Embodiments according to the present technology will now be described below with reference to the drawings.

First Embodiment

[Route Editing System]

Figure 1:
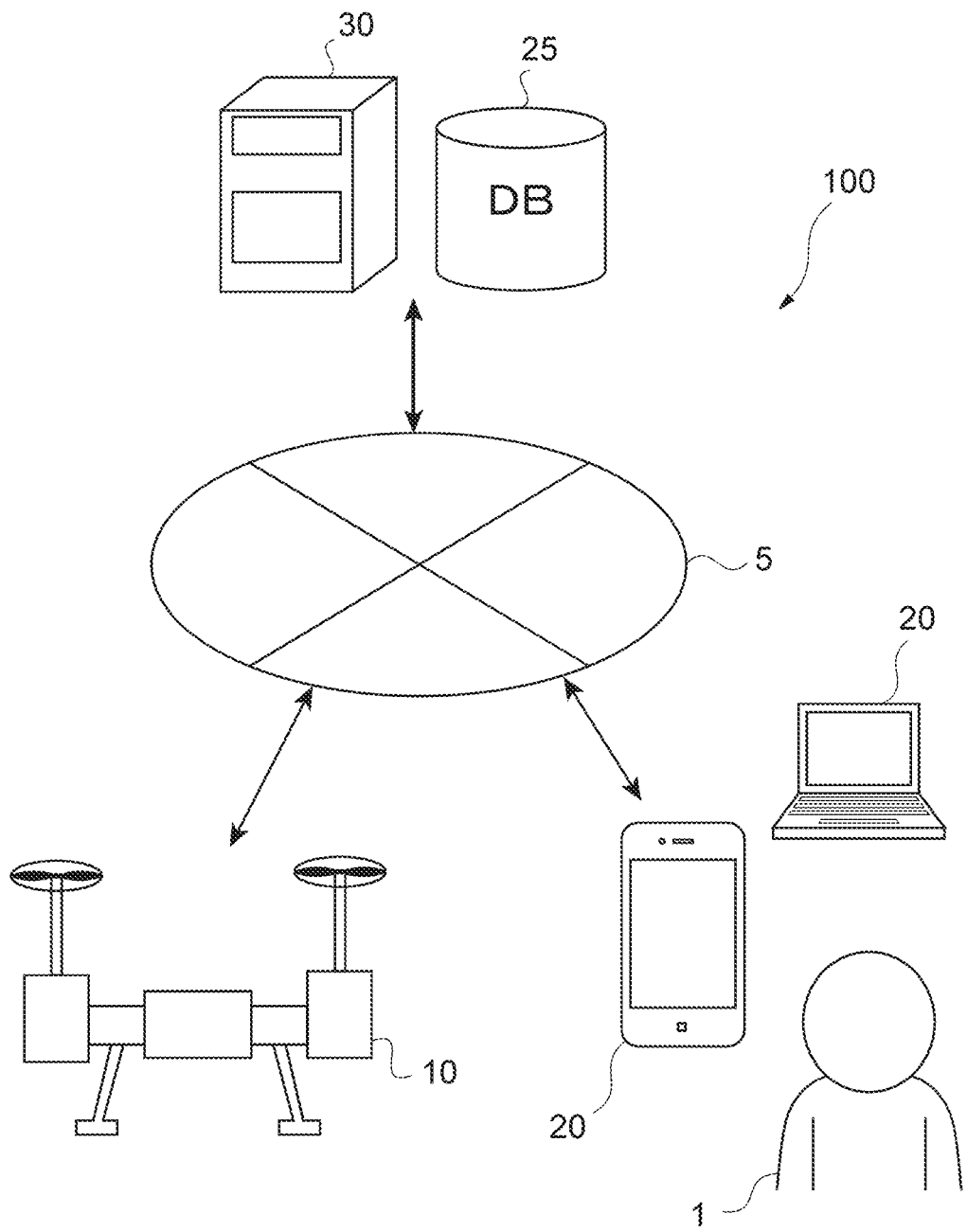
FIG. 1 is a schematic diagram showing a configuration example of a route editing system according to a first embodiment.

FIG. 1 is a schematic diagram showing a configuration example of a route editing system 100 according to a first embodiment of the present technology. The route editing system 100 corresponds to one embodiment of an information processing system according to the present technology.

The route editing system 100 includes a drone 10, a user terminal 20, and a server apparatus 30. The drone 10, the user terminal 20, and the server apparatus 30 are communicably connected to each other via a network 5.

The network 5 is constructed by, for example, the Internet or a wide area communication network. In addition, any wide area network (WAN), any local area network (LAN), or the like may be used, and a protocol for constructing the network 5 is not limited.

The drone 10 is a mobile body including an autonomous movement control unit (not shown) and a drive system including a propeller. The autonomous movement control unit performs various types of control regarding the autonomous movement (autonomous flight) of the drone 10. For example, the autonomous movement control unit executes a self-position estimation, an analysis of a surrounding situation, an action plan using a cost map or the like, the control of the drive system, and the like. Note that in this embodiment the drone 10 corresponds to a mobile body.

The user terminal 20 includes a variety of devices that can be used by the user 1. For example, a personal computer (PC), a smartphone, or the like is used as the user terminal 20. The user 1 can use the route editing system 100 via the user terminal 20.

The server apparatus 30 is capable of providing an application service relating to the route editing system 100. For example, in this embodiment, the server apparatus 30 is capable of editing the route information for the drone 10 on the basis of an instruction of the user 1 to generate it as new route information.

The route information is information including a route including a plurality of positions and a state parameter relating to a moving state of the drone 10 when the drone 10 moves along the route, the state parameter being associated with each position of the route, and will be described in detail later. The server apparatus 30 serves as an embodiment of an information processing apparatus according to the present technology.

The server apparatus 30 includes a database 25 and allows the database 25 to store various types of information regarding the route editing system 100. The server apparatus 30 is also capable of reading various types of information from the database 25 and outputting them to the user terminal 20 or the like.

In this embodiment, the autonomous flight of the drone 10 is executed on the basis of the route information generated by the server apparatus 30. The configuration, method, and the like for implementing the autonomous flight of the drone 10 are not limited, and any technique may be used.

In this embodiment, a so-called cloud service is provided by the network 5, the database 25, and the server apparatus 30. Thus, it can also be said that the user terminal 20 is connected to a cloud network.

Note that the method of communicably connecting the user terminal 20 and the server apparatus 30 to each other is not limited. For example, the user terminal 20 and the server apparatus 30 may be connected to each other using near field communication such as Bluetooth (registered trademark) without constructing a cloud network.

Although a single user 1 is illustrated in the example shown in FIG. 1, the number of users 1 who can use the route editing system 100 is not limited. For example, the route information generated by another user may be acquired and edited by the user 1.

Figure 2:
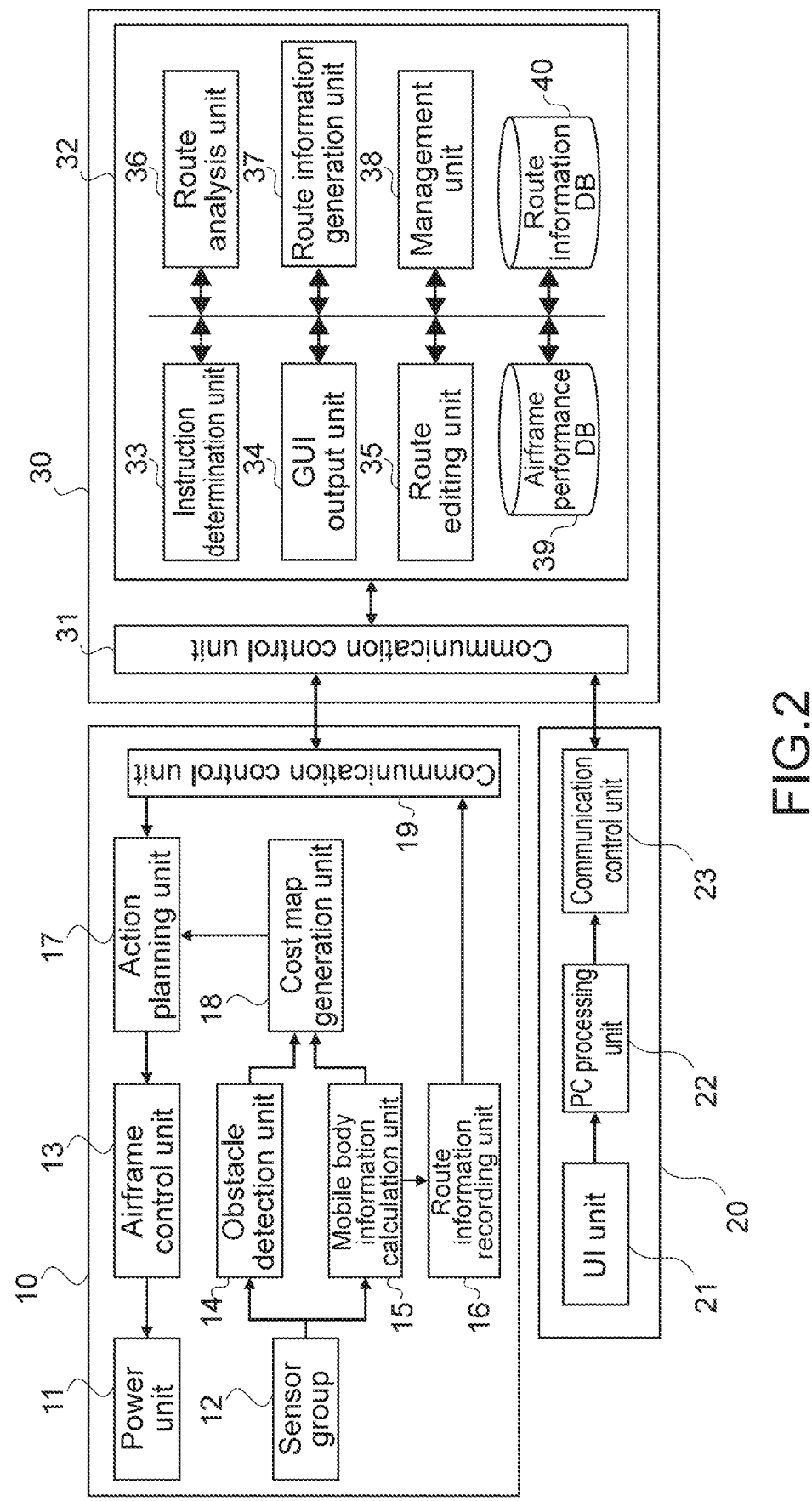
FIG. 2 is a block diagram showing a functional configuration example of the route editing system.

FIG. 2 is a block diagram showing a functional configuration example of the route editing system 100.

The drone 10 includes a power unit 11, a sensor group 12, an airframe control unit 13, an obstacle detection unit 14, a mobile body information calculation unit 15, a route information recording unit 16, an action planning unit 17, a cost map generation unit 18, and a communication control unit 19.

The power unit 11 includes various devices relating to a drive system for moving the drone 10. For example, the power unit 11 includes a servo motor capable of specifying torque, a motion controller that decomposes and replaces the motion of the movement of the drone 10, and a feedback controller by a sensor in each motor.

For example, the power unit 11 also includes a motor including four to six propellers facing upward of the airframe, and a motion controller that decomposes and replaces the motion of the movement of the drone 10 to and with the rotation amount of each motor.

The sensor group 12 includes various sensors for detecting external and internal information of the drone 10 and the self-position of the drone 10. Specifically, for example, the sensor group 12 includes a global positioning system (GPS) for detecting the self-position, a magnetic sensor for measuring the posture of the drone 10, an inertial measuring device (IMU), and the like.

For example, the sensor group 12 also includes a laser ranging sensor for detecting an obstacle or the like, a contact sensor, an ultrasonic sensor, a radar, LiDAR (Light Detection and Ranging, Laser Imaging Detection and Ranging), a barometer for measuring the atmospheric pressure, and the like.

The airframe control unit 13 performs control of the operation of the drone 10 on the basis of the action plan supplied from the action planning unit 17. For example, when the power unit 11 operates on the basis of the control signal, the drone 10 is moved.

The obstacle detection unit 14 detects an obstacle that hinders the movement of the drone 10 on the basis of data or signals from the sensor group 12. For example, the obstacle corresponds to a building or the like that blocks a route included in the route information for the drone 10.

The mobile body information calculation unit 15 calculates various types of information relating to the drone 10 as mobile body information on the basis of the data or signals from the sensor group 12. For example, the state parameter relating to the moving state of the drone 10 is calculated as information included in the mobile body information. The state parameter relating to the moving state of the drone 10 is a parameter indicating how the drone 10 moves along the route. In this embodiment, the state parameter relating to the moving state includes the velocity of the drone 10, the posture of the drone 10, and the like. For example, the state parameter of the drone 10 is associated with each position on the route (position at every predetermined time interval), such as the velocity and posture of the drone 10 at a position A on the route, the velocity and posture thereof at a position B on the route, and the like.

In addition, the self-position and acceleration of the drone 10, the presence or absence and contents of an abnormality, the states of other devices mounted on the drone 10, and the like are calculated as the mobile body information.

Note that in this embodiment the state parameter relating to the moving state of the drone 10 corresponds to the state parameter relating to the moving state of the mobile body when the mobile body moves along the route, the state parameter being associated with each position of the route.

The route information recording unit 16 records the route information including the route along which the drone 10 has moved and the state parameter relating to the moving state of the drone 10, which have been calculated by the mobile body information calculation unit 15.

In the present disclosure, the route includes both of a route (trajectory) along which the drone 10 is to move or a route (trajectory) along which the drone 10 has already moved.

For example, the route information is calculated from the position information of the drone 10 at each time from the start of the movement to the end of the movement. In this case, the route includes position information at each time from the position information of a point where the drone 10 starts moving to the position information of a point where the drone 10 finishes moving. In other words, the route can be said to be a trajectory of the drone 10, in which the pieces of position information (waypoints) of the drone 10 that has moved are integrated.

In this embodiment, the state parameter relating to the moving state of the drone 10 is associated with each piece of position information included in the route. For example, the coordinates at which the drone 10 is located at a certain time and the velocity or posture of the drone 10 at the coordinates are associated with each other. Those pieces of information are recorded as the route information.

The route also includes a flight pattern of the drone 10 and the like. In other words, the route also includes a trajectory defined as a pattern, such as turning or flying in a figure eight. For example, as the state parameter relating to the moving state of the drone 10, the velocity, the posture, or the like of the drone 10 when performing turning or flying in a figure eight is associated with a flight pattern such as turning or flying in a figure eight, and those are recorded as the route information.

The state parameter associated with the flight pattern may be set by default. In other words, how to move on a predetermined flight pattern may be set by default.

Note that in this embodiment the route along which the drone 10 has moved corresponds to a route including a plurality of positions.

The action planning unit 17 makes an action plan of the drone 10 on the basis of information supplied from the cost map generation unit 18 and the communication control unit 19. For example, the action planning unit 17 performs planning such as starting, stopping, traveling direction (e.g., forward, backward, left, right, or change of direction), and moving velocity. The action plan also includes route information. In other words, the action plan includes autonomous flight, such as avoidance of obstacles, of the drone 10, and the flight of the drone 10 according to a route including a plurality of positions included in the route information and a state parameter relating to the moving state of the drone 10.

The communication control unit 19 communicates with a communication control unit 31 that allows communication with the server apparatus 30. Note that the method of communicably connecting the communication control units 19 (31) to each other is not limited. For example, any network such as a WAN or LAN is used. The communication control unit 19 (31) is capable of transmitting and receiving various types of information (data) by controlling the communication device such as a module for establishing communication or a router.

The user terminal 20 includes a UI unit 21, a PC processing unit 22, and a communication control unit 23.

The UI unit 21 includes any UI device, such as an image display device such as a display, a sound output device such as a speaker, or an operation device such as a keyboard, a switch, a pointing device, or a remote controller. Of course, a device having both functions of an image display device and an operation device, such as a touch panel, is also included.

In addition, various GUIs displayed on a display, a touch panel, or the like can be regarded as elements included in the UI unit 21.

The PC processing unit 22 can execute various types of processing on the basis of an instruction input by the user 1, a control signal from the server apparatus 30, and the like. For example, various types of processing including displaying of route information and displaying a GUI for inputting an instruction regarding a route connection are executed.

The communication control unit 23 communicates with the communication control unit 31 that allows communication with the server apparatus 30. Note that the method of communicably connecting the communication control units 23 (31) to each other is not limited. For example, any network such as a WAN or LAN is used. The communication control unit 23 (31) is capable of transmitting and receiving various types of information (data) by controlling the communication device such as a module for establishing communication or a router.

Figure 14:
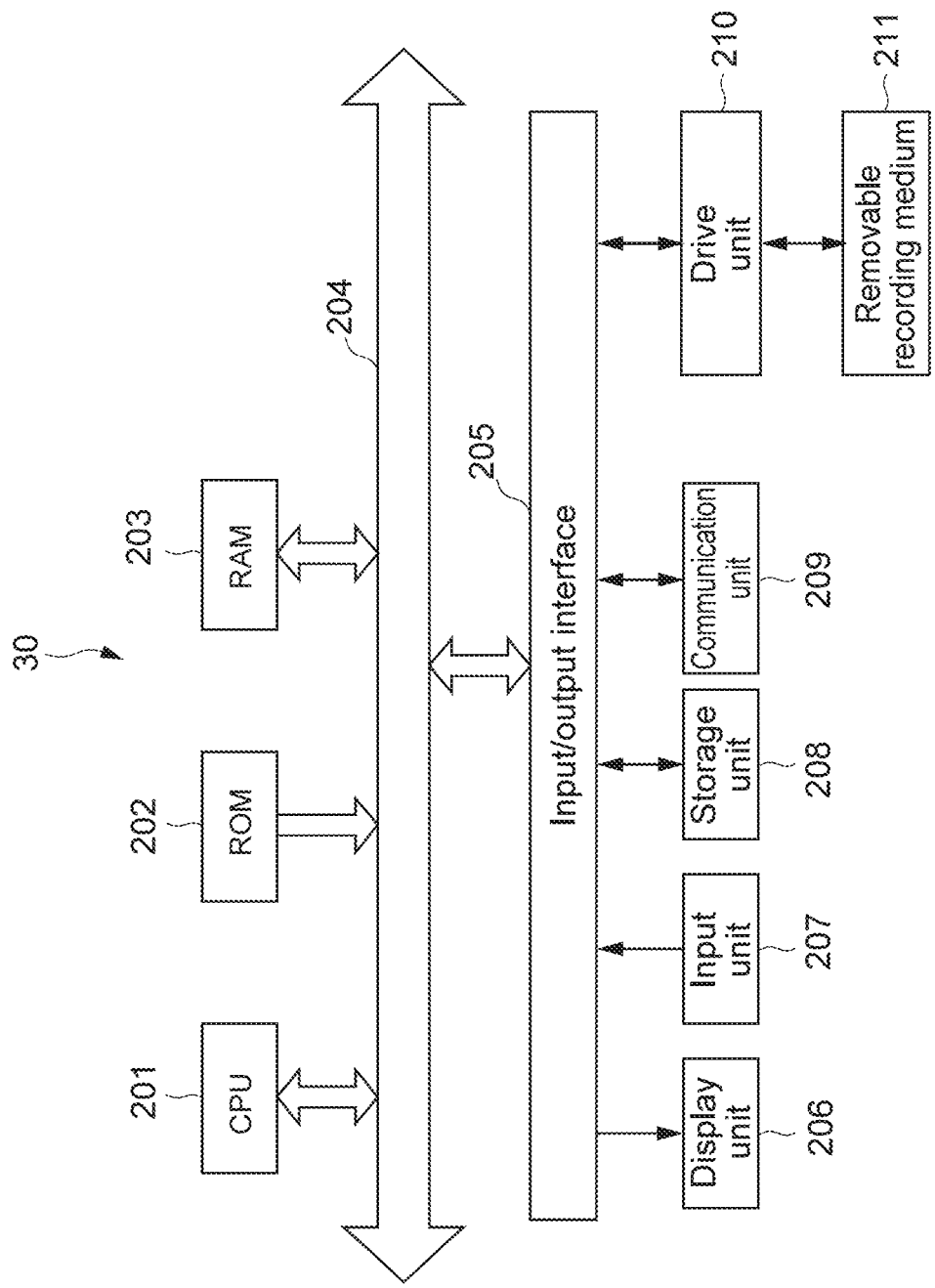
FIG. 14 is a block diagram showing a hardware configuration example of a server apparatus.

The server apparatus 30 includes hardware required for the configuration of a computer, such as a CPU, a ROM, a RAM, and an HDD (see FIG. 14). The CPU loads a program according to the present technology, which is recorded in advance in the ROM or the like, into the RAM and executes the program, so that each functional block illustrated in FIG. 2 is implemented, and an information processing method according to the present technology is executed.

For example, the server apparatus 30 can be implemented by any computer such as a PC. Of course, hardware such as a FPGA or ASIC may be used. Further, in order to implement each block illustrated in FIG. 2, dedicated hardware such as an integrated circuit (IC) may be used.

The program is installed in, for example, the server apparatus 30 via various recording media. Alternatively, the program may be installed via the Internet or the like.

The server apparatus 30 includes the communication control unit 31 and a route control unit 32. In this embodiment, the route control unit corresponds to a GUI generation unit.

The communication control unit 31 controls communication with the drone 10 and the user terminal 20. For example, the communication control unit 31 receives a connection instruction of the route information input via the user terminal 20, and supplies the received connection instruction to the route control unit 32. Further, the route information generated by the route control unit 32 is transmitted to the drone 10.

The route control unit 32 includes an instruction determination unit 33, a GUI output 34, a route editing unit 35, a route analysis unit 36, a route information generation unit 37, and a management unit 38. Note that an airframe performance DB 39 and a route information DB 40 are constructed in the data base 25 shown in FIG. 1.

The blocks included in the route control unit 32 cooperate with each other, and the display of a route editing GUI, the generation of the route information after editing, and the like is executed.

The instruction determination unit 33 determines instruction information relating to various instructions input by the user 1. For example, an instruction (instruction information) to acquire the route information input through the route editing GUI by the user 1 is output to the management unit 38. Further, for example, an instruction to connect the routes, or the like is output to the route editing unit 35.

The GUI output unit 34 generates and outputs a route editing GUI. For example, various types of information included in the route editing GUI are updated in response to an instruction from the user 1 or the like. The GUI output unit 34 is capable of appropriately generating and outputting an image of the updated information. For example, in this embodiment, the GUI output unit 34 outputs a route included in the route information, information relating to editing the route, a determination result of the route, and the like.

Hereinafter, the output of an image or a GUI containing predetermined information may be represented as displaying of an image or a GUI containing predetermined information.

The route editing unit 35 is capable of editing the route on the basis of an instruction relating to a route connection determined by the instruction determination unit 33. In this embodiment, the instruction relating to a route connection includes an instruction to cut out a part of the route included in the route information, an instruction to duplicate the route or a part of the route, an instruction to connect a first route and a second route, an instruction to set a first smoothing point and a second smoothing point, an instruction to set a smoothing region, an instruction to execute smoothing, and the like.

In other words, on the basis of the instruction determined by the instruction determination unit 33, the route editing unit 35 cuts out a part of the route included in the acquired route information (cut), duplicates the route or a part of the route (copy), connects the acquired routes to each other, sets a first smoothing point and a second smoothing point, sets a smoothing region, and performs smoothing.

Hereinafter, in order to make the description easy to understand, a route in which the end point thereof is to be connected to another route is referred to as a first route in two routes for which connection is instructed. Further, a route to which the start point thereof is to be connected is referred to as a second route.

For example, it is assumed that information indicating that two routes are to be connected is input. In each of the two routes, a start point (endpoint of movement start) and an end point (endpoint of movement end) are set. Typically, the end point of one route and the start point of the other route are connected to each other, and that position is the position of the connected point. In other words, the route in which the end point is the connected point is the "first route", and the route in which the start point is the connected point is the "second route".

Of course, the present technology is applicable without being limited to the case where the "first route" and the "second route" are defined in such a manner.

Further, the route information including the first route and the state parameter associated with each position of the first route is defined as first route information. Further, the route information including the second route and the state parameter associated with each position of the second route is defined as second route information.

The route editing unit 35 is capable of connecting the first route included in the acquired first route information and the second route included in the second route information to each other. In this embodiment, the end point of the first route and the start point of the second route are connected to each other. Therefore, the end point of the first route and the start point of the second route become the connected point of the two routes.

Further, the route editing unit 35 is capable of performing smoothing on the first route and the second route connected to each other. Specifically, a difference between a first state parameter associated with a first smoothing point on the first route and a second state parameter associated with a second smoothing point on the second route is smoothed.

Note that in this embodiment the route editing unit 35 functions as a connection unit and a smoothing unit.

The route analysis unit 36 makes a determination regarding the connection of the routes. In this embodiment, it is determined whether or not the difference between the first state parameter associated with the first smoothing point and the second state parameter associated with the second smoothing point is to be smoothed.

For example, the end point of the first route and the start point of the second route are connected to each other, and whether to smooth the difference between the first state parameter and the second state parameter is determined on the basis of the difference between the state parameter associated with the end point of the first route and the state parameter associated with the start point of the second route. Of course, the present technology is not limited to the above.

In addition, the route analysis unit 36 determines the easiness of connection with another route with respect to each position of the route included in the acquired route information. The determination result determined by the route analysis unit 36 is displayed in the route editing GUI through the GUI output unit 34.

In this embodiment, the route analysis unit 36 functions as a smoothing determination unit and a connection determination unit.

The route information generation unit 37 generates new route information in accordance with the connection of the routes, the copy of the route, the cut of the route, and the like. For example, if routes are connected to each other, the state parameter relating to the moving state of the mobile body is associated with the connected route in which the first route and the second route are connected to each other. The state parameter associated with the connected route is generated on the basis of the state parameter associated with each position of the first route and the state parameter associated with each position of the second route.

For example, if smoothing is performed, a state parameter including a result of the smoothing is associated. In other words, in this embodiment, the route information is generated, in which the route including the first route and the second route connected to each other is associated with the state parameter including the result of the smoothing.

If smoothing is not performed, for example, the state parameter associated with each position of the first route and the state parameter associated with each position of the second route are directly associated with each position other than the connected point. For example, either the state parameter associated with the end point of the first route or the state parameter associated with the start point of the second route is associated with the position of the connected point.

As for the copy of the route, the state parameter is also copied, and the route information is generated.

As for the cut of the route, the state parameter relating to the moving state of the mobile body associated with each position of the cut route is used as it is.

The new route information generated by the route information generation unit 37 is displayed in the route editing GUI through the GUI output unit 34.

In this embodiment, the route information generation unit 37 functions as a generation unit.

The management unit 38 manages the airframe performance DB 39 and the route information DB 40. In this embodiment, the management unit 38 performs addition, storage, and the like of the route information stored in the route information DB 40. For example, according to the management unit 38, the route information acquired through an instruction or the like by the user 1 is stored in the route information DB 40. Further, the management unit 38 stores the new route information generated by the route information generation unit 37 in the route information DB 40.

In addition, the management unit 38 performs addition, storage, and the like of performance information relating to the airframe performance of the drone 10 that is stored in the airframe performance DB 39. For example, the management unit 38 acquires performance information from the drone 10 used by the user 1. Note that the method of acquiring the performance information of the drone 10 is not limited. For example, the performance information of the drone 10 may be acquired from a manufacturer who manufactures the drone 10.

In this embodiment, an acquisition unit is implemented by the route editing unit 35, the management unit 38, and the like.

FIG. 3 is a schematic diagram showing the configuration of the route information DB 40. The route information DB 40 is a DB commonly used throughout the route editing system 100. Note that even when the route information DB 40 is constructed for each user, the present technology is also applicable.

Airframe information, the date of movement, and time series data are stored in the route information DB 40 for each route.

The airframe information is an ID capable of identifying the drone 10 that has moved along the route. For example, a number with which the drone 10 that has moved along that route can be identified is assigned.

The date of movement is the date on which the drone has moved along the route. As shown in FIG. 3, the time series data is stored for each date when an airframe 1 has moved along a route A.

The time series data is the position, velocity, and the like at each time at which the drone 10 has moved along the route A.

For example, information such as "time 0.000, position [x, y, z]=[100, 200, 300], velocity [vx, vy, vz]=[0, 0, 0] (m/s)," and "time 0.100, position [x, y, z]=[101, 201, 300], velocity [vx, vy, vz]=[0.1, 0.2, 0] (m/s)" are stored as time series data of the airframe 1 that moved along the route A on February 3. Similarly, time series data of February 4 is stored.

In addition, for example, information such as "time 0.000, position [x, y, z]=[200, 200, 300], velocity [vx, vy, vz]=[0, 0, 0] (m/s)" is stored as time series data of the airframe 1 that moved along a route B on February 3.

As the time, the information of an absolute time may be stored, or the information of a relative time may be stored on the basis of a predetermined timing. For example, the relative time from the timing at which the drone 10 starts moving may be stored.

As the position (coordinates), absolute coordinates (world coordinates) may be stored, or relative coordinates based on a predetermined position (predetermined coordinate system) may be stored. For example, the relative coordinates in which the point at which the drone 10 has started moving is used as the origin may be stored.

Note that the information regarding the route information is not limited to the above. For example, the route information may include information such as the weather or wind on the date of movement. Further, in the case of a drone having an imaging function, the route information may include position information for imaging, direction information of a camera, and the like.

FIG. 4 is a schematic diagram showing the configuration of the airframe performance DB 39.

In the airframe performance DB 39, performance information relating to the performance of the drone is stored for each drone.

The performance information is information indicating the performance relating to the movement of the drone 10 or the like. In this embodiment, the maximum velocity of the drone 10, the maximum acceleration of the drone 10, the maximum deceleration of the drone 10, and the maximum angular velocity of the drone 10 are stored. A configuration in which at least one of those parameters is stored may also be provided.

Figure 5:
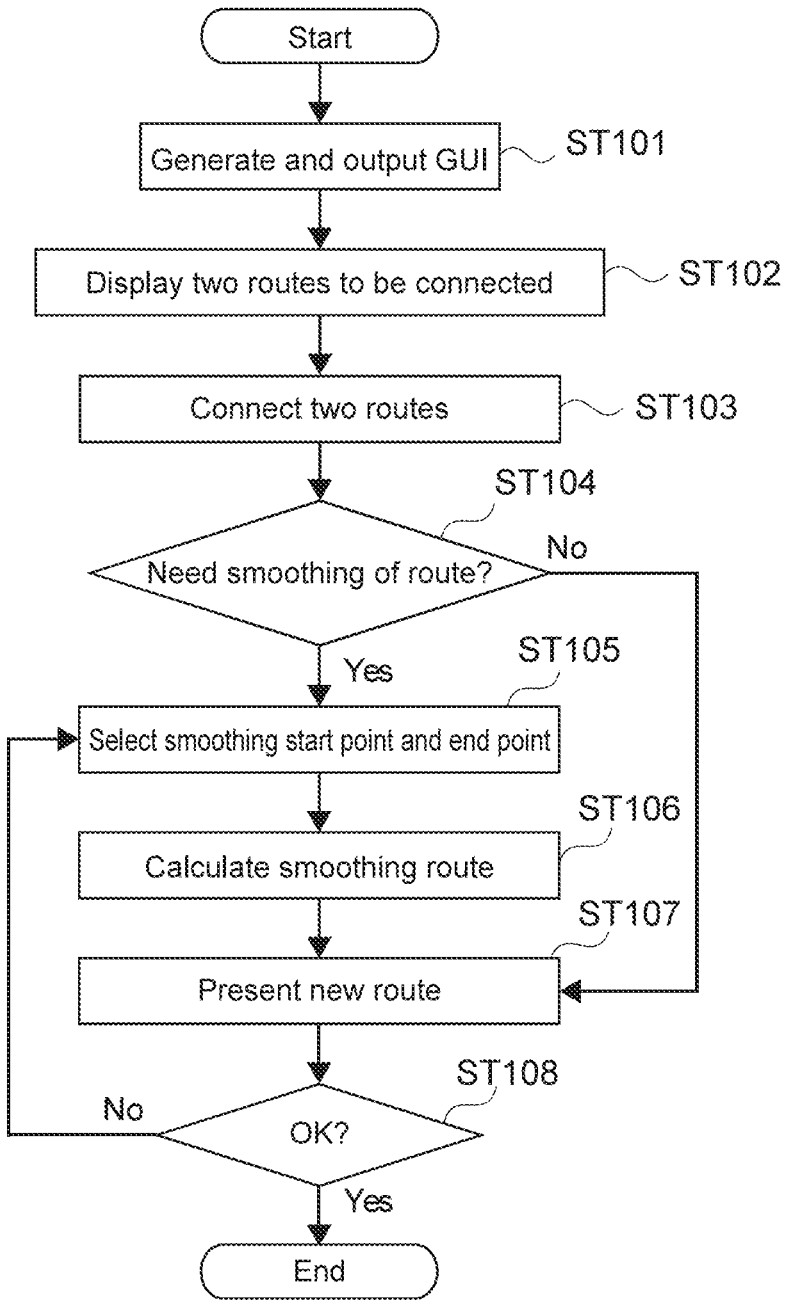
FIG. 5 is a flowchart showing an example of connection and smoothing of the route information.

As shown in FIG. 5, information such as "maximum velocity [x, y, z]=[20, 20, 5] (m/s), maximum acceleration [x, y, z]=[5, 5, 2] (m/s^2), maximum deceleration [x, y, z]=[5, 5, 2] (m/s^2), and maximum angular velocity [x, y, z]=[3, 3, 1] (rad/s)" is stored in the airframe performance DB 39 as the performance information of the airframe 1.

Further, information such as "maximum velocity [x, y, z]=[30, 30, 8] (m/s), maximum acceleration [x, y, z]=[7, 7, 4] (m/s^2), maximum deceleration [x, y, z]=[5, 5, 2] (m/s^2), and maximum angular velocity [x, y, z]=[3, 3, 1] (rad/s)" is stored in the airframe performance DB 39 as the performance information of an airframe 2.

Note that the type of the performance information stored in the airframe performance DB 39 is not limited. For example, the maximum flight time, the maximum communication distance, or the like of the drone 10 may be stored. For example, if the drone has an imaging function, a shutter speed, an imaging angle of view, or the like may be stored as performance information.

[Operation of Route Editing System]

FIG. 5 is a flowchart showing an example of connection and smoothing of the route information. FIGS. 6 to 12 are schematic diagrams each showing an example of the route editing GUI until new route information is generated. The flowchart of FIG. 5 will be described below with reference to the route editing GUI of FIGS. 6 to 12.

The user 1 uses the route editing system 100 to set a route along which the drone 10 moves, and a state parameter such as a velocity or a posture when the drone 10 moves along the route. For example, the user 1 starts an application program relating to the route editing system 100 through the user terminal 20.

The GUI output unit 34 generates a route editing graphical user interface (GUI) for inputting an instruction regarding connection of routes included in the route information, and outputs the GUI to the user terminal 20 (Step 101). The transmitted route editing GUI is displayed on a display or the like of the user terminal 20.

The user 1 specifies the route information desired by the user 1. For example, the route information stored in the route information DB 40 is displayed in a list. For example, the route information may be listed together with information relating to the route information. Examples of the information relating to the route information include any information such as a creator of the route information, a time when the route information is created, and a model of a drone moved on the basis of the route information.

Of course, the route included in the route information and the state parameters relating to the moving state of the mobile body may be displayed so as to be distinguishable.

The user 1 specifies route information including a route to be connected to another route or route information including a route to be copied or cut, or the like.

The management unit 38 acquires the specified route information from the route information DB. The acquired route information is displayed in the route editing GUI through the GUI output unit 34.

Note that the GUI for selecting route information can also be regarded as a GUI included in the route editing GUI.

Figure 6:
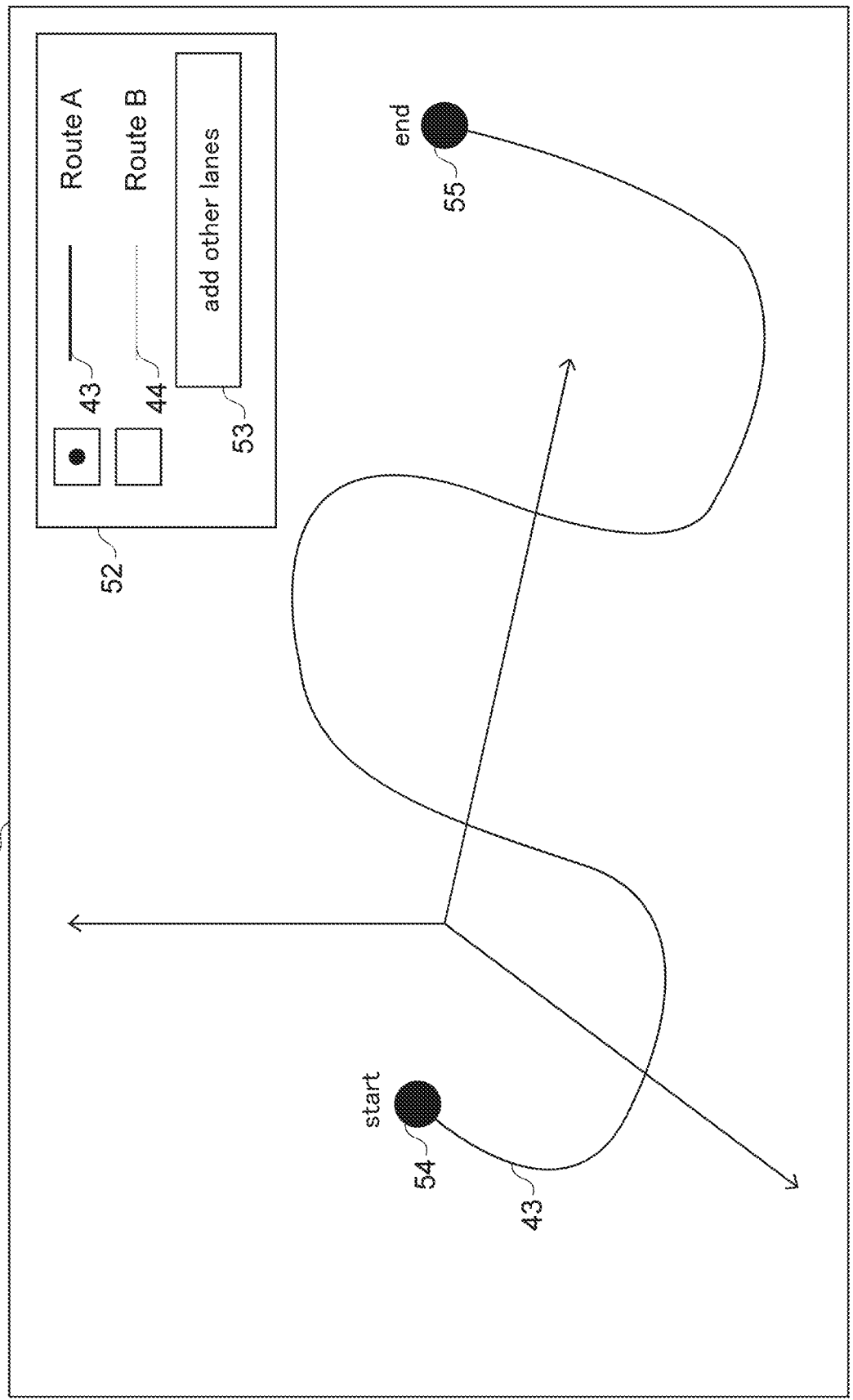
FIG. 6 is a schematic diagram showing an example of a route editing GUI.

As shown in FIG. 6, a route editing GUI 50 includes a route display part 51 and a display selection part 52.

A route included in the route information specified by the user 1 is displayed in the route display part 51. In the example shown in FIG. 6, the display of a route A 43 is selected.

In this embodiment, a start point 54 of the route A 43, which is the point at which the drone 10 starts moving, an end point 55, which is the point at which the drone 10 finishes moving, and the trajectory of the mobile body along which the mobile body moves, are displayed. For example, the start point 54 corresponds to the position of the drone 10 at time 0.

Further, in this embodiment, the axes of the orthogonal coordinates indicating the x-, y-, and z-axis directions are displayed in the route display part 51. Each route is displayed in the route display part 51 on the basis of the position information (xyz coordinate values) of the route included in the route information.

The display selection part 52 is a GUI for selecting a route (route information) displayed in the route display part 51.

In the example shown in FIG. 6, a route B 44 is specified in addition to the route A 43, and the display of the route A 43 is selected from the routes A 43 and B 44.

Note that selecting an addition button 53 in the display selection part 52 makes it possible to add and display a new route. In other words, it is possible to additionally specify new route information and display a route included in the route information.

Note that the number of routes selectable by the display selection part 52 is not limited, and any number of routes may be displayed in the route display part 51. In this case, each route may be displayed so as to be distinguishable by changing the color, thickness, or the like of each route.

Figure 7:
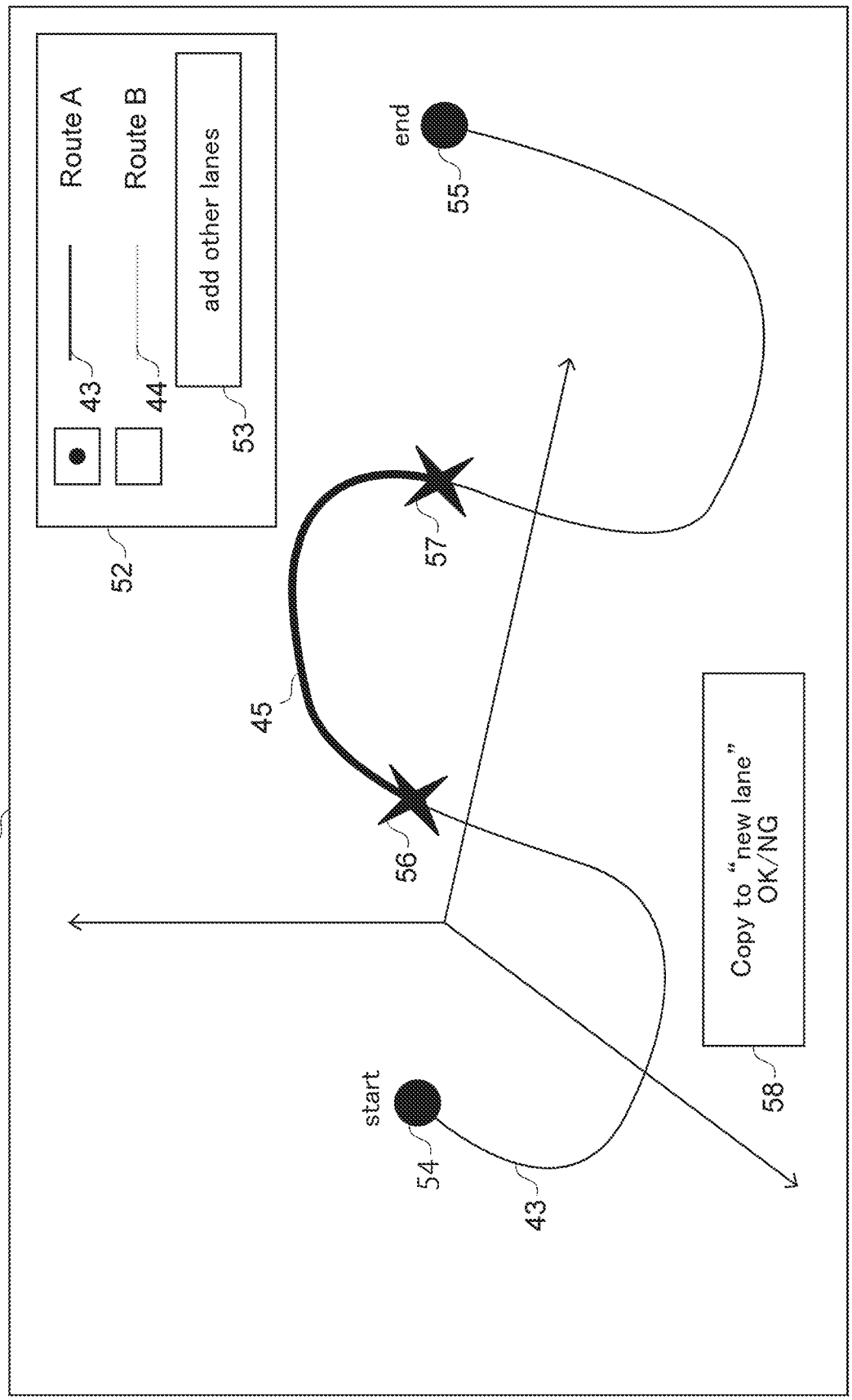
FIG. 7 is a diagram showing an input example of an instruction to cut out (cut) and duplicate (copy) a part of the route.

FIG. 7 is a diagram showing an input example of an instruction to cut out (cut) and duplicate (copy) a part of the route.

For example, the user 1 selects two points on the route A 43 as cutting points 56 and 57. The partial route A 45 sandwiched between the cutting points 56 and 57 is displayed so as to be distinguishable. For example, the partial route A 45 may be displayed thicker than the other portions of the route or may be displayed in a different color from other routes.

Notification information 58, which allows selection of whether to duplicate the cut partial route A 45 or not, is displayed. The partial route A 45 is duplicated when the user 1 selects duplication via the notification information 58. The present technology is not limited to the above, and the partial route A 45 may be duplicated by inputting a specific instruction such as a hot key.

In this embodiment, the instruction of the user 1 to execute the duplication of the partial route A 45 corresponds to an instruction to duplicate the route or a part of the route.

Figure 8:
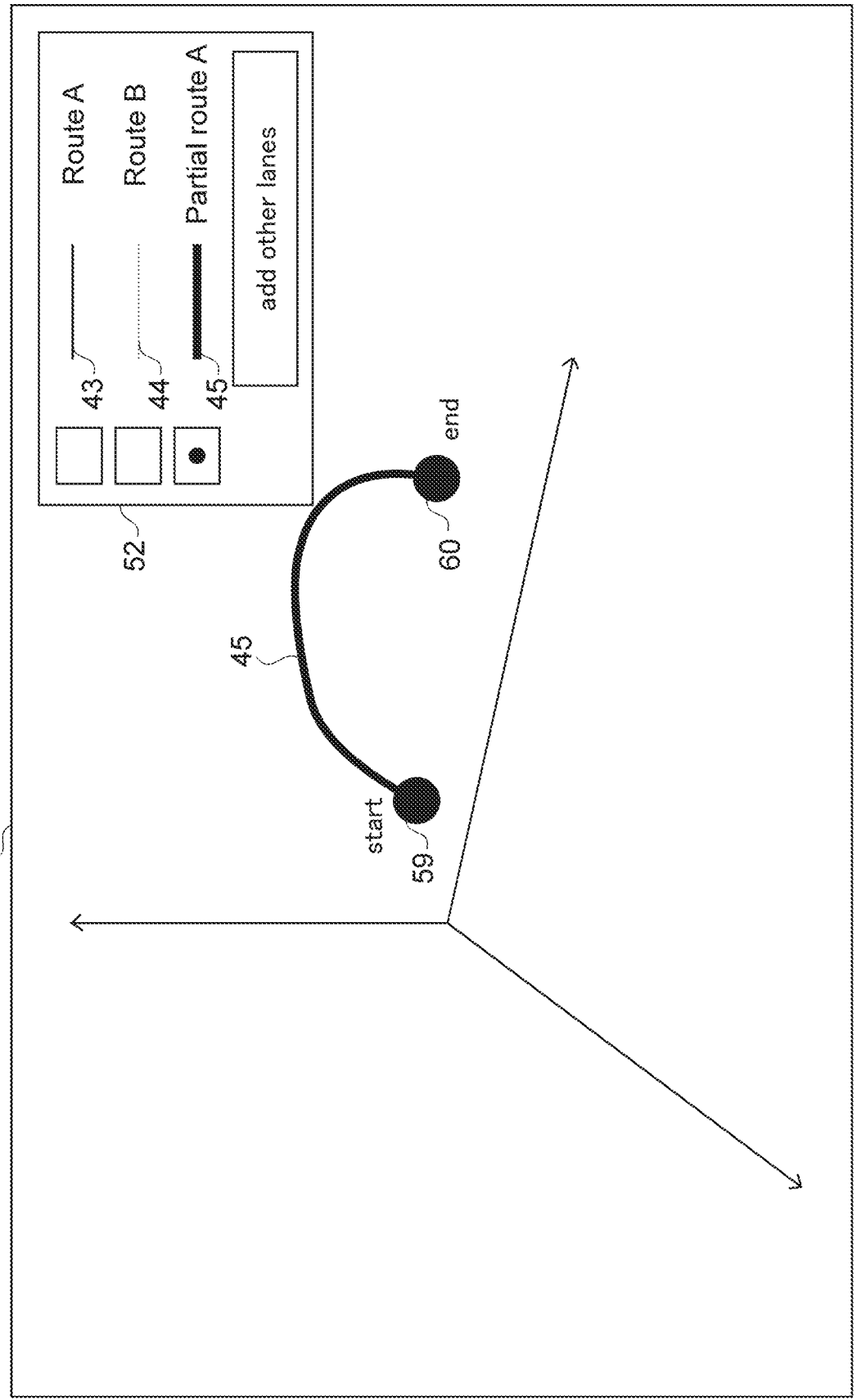
FIG. 8 is a diagram showing a display example of a duplicated partial route.

FIG. 8 is a diagram showing a display example of the duplicated partial route 45.

As shown in FIG. 8, when the partial route A 45 is duplicated, the partial route A 45 is displayed in the route display part 51. Further, the route information generation unit 37 shown in FIG. 2 newly generates route information including the partial route A 45 and the state parameter. As the state parameter, the state parameter at each position of the original route A is used as it is.

For a start point 59 and an end point 60 of the partial route A 45, for example, the times associated with the positions of the start point 59 and the end point 60 are compared, and the earlier one is set to the start point 59.

Figure 9:
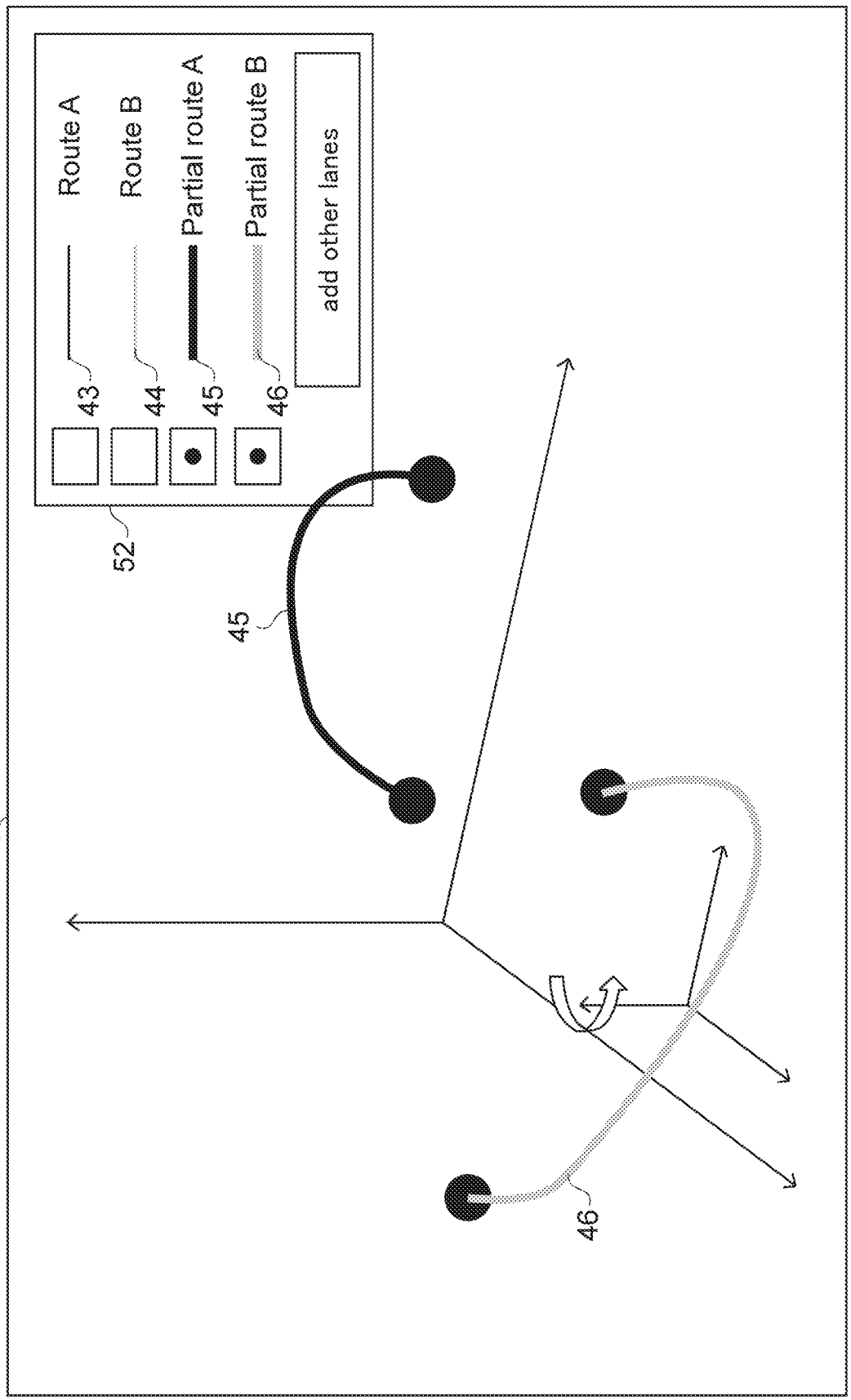
FIG. 9 is a diagram showing a display example of two partial routes to be connected to each other.

FIG. 9 is a diagram showing a display example of two partial routes to be connected.

As shown in FIG. 9, it is assumed that cutout (cut) and duplication (copy) of a part of the route is also performed on the specified route B 44. Both the duplicated partial route A 45 and the duplicated partial route B 46 are displayed in the route display part 51.

As shown in FIG. 9, the route editing unit 35 may be capable of moving and rotating the partial route in accordance with an instruction from the user 1.

For example, as schematically illustrated for the partial route B 46 of FIG. 9, the route may be rotatable with the z-axis as the rotation axis. The route information including the rotated partial route B 46 is generated as new route information by the route information generation unit 37. For example, the position information (coordinates) indicating the route of the partial route B 46 after rotation is set on the basis of the position displayed in the route display part 51.

The rotation axis capable of rotating the route is not limited, and may be arbitrarily set. For example, the route may be rotatable with the x-axis or the y-axis as the rotation axis. In this case, the posture of the drone 10 may not be changed, and only the route (position coordinates) may be changed, thus generating route information.

It is assumed that a connection instruction is input for the partial route A 45 and the partial route B 46 shown in FIG. 9. In other words, the partial route A 45 and the partial route B 46 shown in FIG. 9 are displayed as two routes to be connected to each other (Step 102).

Of course, the two routes to be connected to each other are not limited to the routes on which cut, copy, and the like have been performed. When the user 1 selects two pieces of route information intended to be connected to each other, the two routes included in the route information are displayed as two routes to be connected to each other.

Figure 10:
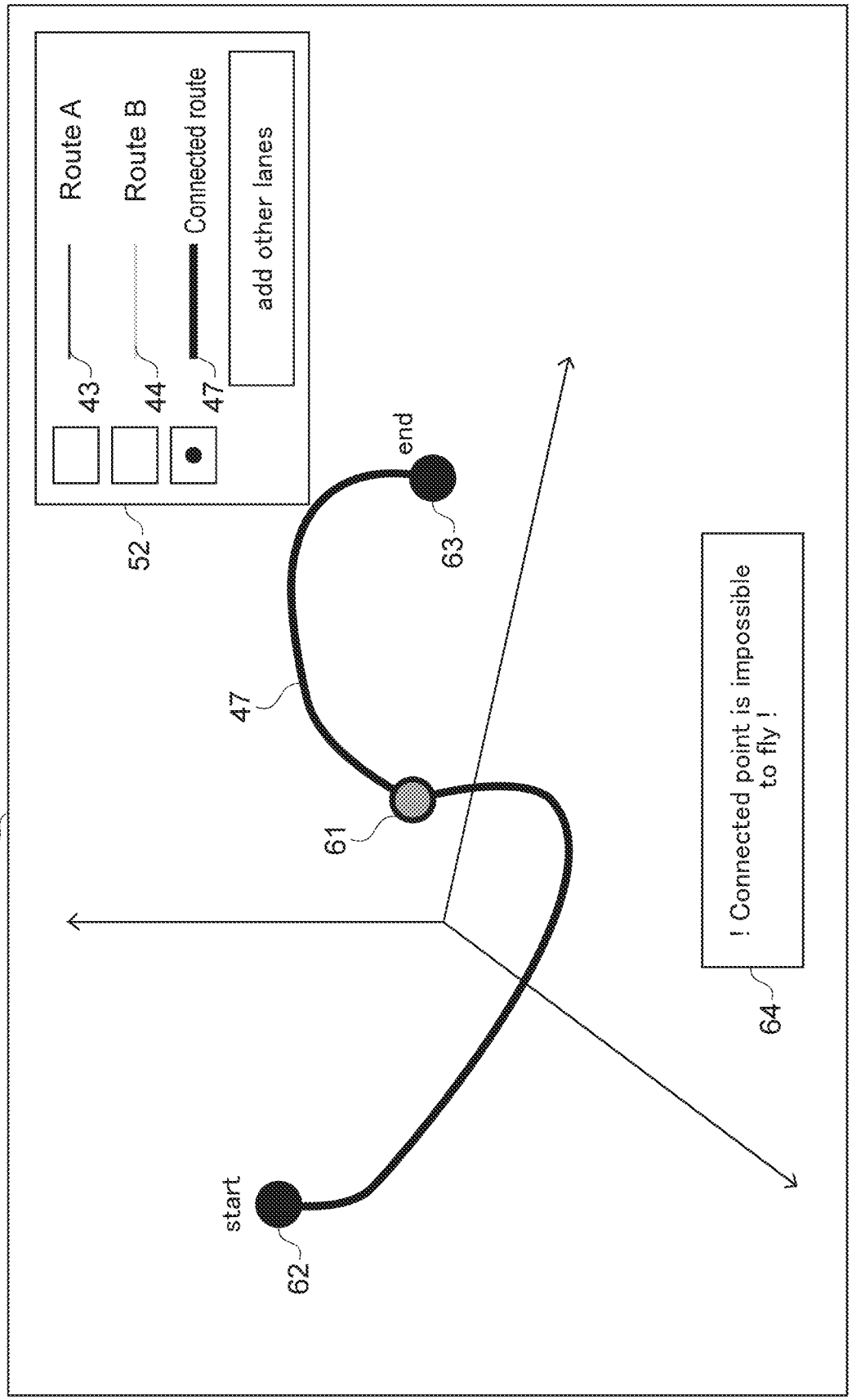
FIG. 10 is a schematic diagram showing a connected route.

FIG. 10 is a schematic diagram showing a connected route.

As shown in FIG. 10, the partial routes A 45 and B 46 are connected to each other in response to an instruction to connect the partial routes A 45 and B 46 (Step 103).

For example, the end point of the partial route B 46 is superimposed on the position of the start point of the partial route A 45 by the user 1. The position where the end point of the partial route B 46 and the start point of the partial route A 45 are superimposed becomes a connected point 61. Further, the start point of the partial route B 46 is set as the start point of a connected route 47 in which the partial routes A 45 and B 46 are connected to each other. The end point of the partial route A 45 is set as the end point of the connected route 47.

The route analysis unit 36 determines whether or not smoothing is necessary for the connected route 47 (Step 104). Typically, the presence or absence of the need for smoothing is determined on the basis of whether or not the drone 10 can fly through the connected point 61.

If the drone 10 can fly along the connected route 47, it is determined that smoothing is not necessary. If the drone 10 fails to fly along the connected route, it is determined that smoothing is necessary. Of course, the present technology is not limited to the above, and any determination reference may be adopted, such as whether or not smooth flight is made possible, whether or not highly safe flight is made possible, and the like.

In this embodiment, the start point of the partial route B 46 is connected to the end point of the partial route A 45, and it is determined whether to smooth the difference between the first state parameter and the second state parameter on the basis of the difference between the state parameter B associated with the start point of the partial route B 46 and the state parameter A associated with the start point of the partial route A 45.

The information regarding the connected point includes the state parameter associated with the start point or end point of the two routes that is the connected point, and the route directions of the two routes at the connected point. For example, the information regarding the connected point includes information regarding the state parameter associated with the endpoint of the partial route A 45 and the state parameter associated with the endpoint of the partial route B 46. The information regarding the connected point also includes position (coordinate) information of the endpoint of the partial route A 45 and the endpoint of the partial route B 46 connected to each other.

In this embodiment, the difference between the state parameter B of the partial route B 46 at the end point of the partial route B 46 and the state parameter A of the partial route A 45 at the start point of the partial route A 45 is referenced as information regarding the connected point 61. Alternatively, the difference between the route direction of the partial route B at the end point of the partial route B 46 and the route direction of the partial route A 45 at the start point of the partial route A 45 may be referenced.

In this embodiment, as shown in FIG. 10, when it is determined that the connected route 47 needs to be smoothed (YES in Step 104), notification information 64 indicating that the flight is impossible is displayed to the user 1.

Figure 11:
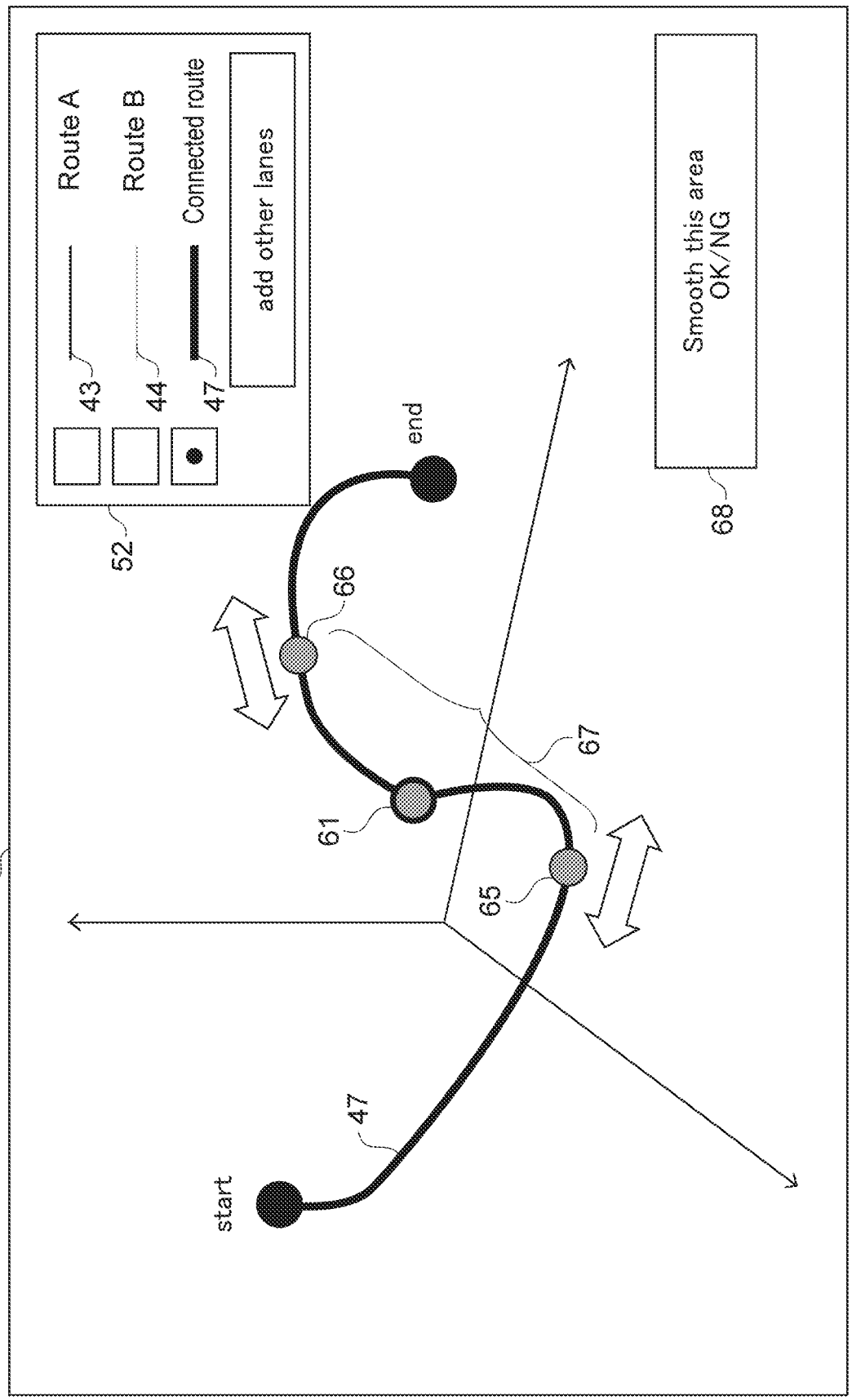
FIG. 11 is a schematic diagram showing an input example when a smoothing region is set.

FIG. 11 is a schematic diagram showing an input example when a smoothing region is set.

If it is determined that smoothing of the connected route 47 is necessary (YES in Step 104), two positions on the connected route 47 are set as a smoothing start point 65 and a smoothing end point 66 according to the instruction of the user 1 (Step 105).

The route editing unit 35 smooths the route in a smoothing region 67 (Step 106). Specifically, the difference between the state parameter (state parameter B) associated with the smoothing start point 65 and the state parameter (state parameter A) associated with the smoothing end point 66 is smoothed.

Note that in this embodiment the method of setting the smoothing region 67 is not limited. For example, the smoothing region 67 may be set without an instruction to select the smoothing start point 65 and the smoothing end point 66 by the user 1. For example, the smoothing start point 65 and the smoothing end point 66 may be set with reference to the connected point 61 at which the partial route B 46 and the partial route A 45 are connected to each other. In this case, the route editing unit 35 smooths the difference between the state parameter associated with the smoothing start point 65 on the partial route B 46 in the set smoothing region 67 and the state parameter associated with the smoothing end point 66 of the partial route A 45 in the smoothing region 67.

Note that in this embodiment the smoothing start point 65 corresponds to a first smoothing point on the first route. Further, the smoothing end point 66 corresponds to a second smoothing point on the second route. The connected point 61 corresponds to a connected point at which the first route and the second route are connected to each other.

[Calculation for Smoothing]

An example of the smoothing in Step 206 will now be described with reference to FIG. 11.

When the user 1 selects the smoothing start point 65 and the smoothing end point 66, the route editing unit 35 acquires the positions (coordinates) indicating the smoothing start point 65 and the smoothing end point 66 and the velocities (state parameters) associated with the positions.

Further, the management unit 38 acquires performance information of the drone 10 moving along the connected route 47. In this embodiment, the maximum acceleration and the maximum deceleration of the drone 10 are acquired.

The velocity of the drone 10 at the smoothing start point 65 is expressed by the following equation (1).

$$V(\text{start}) = [vx1, vy1, vz1] \qquad [\text{Math. 1}]$$

Here, $vx1$ represents the velocity on the x-axis of the drone 10. $vy1$ represents the velocity on the y-axis. $vz1$ represents the velocity on the z-axis. Hereinafter, in the parameters and the like described as [A, B, C], A corresponds to an x-axis component, B corresponds to a y-axis component, and C corresponds to a z-axis component.

The velocity of the drone 10 at the smoothing end point 66 is expressed by the following equation (2).

$$V(\text{end}) = [vx2, vy2, vz2] \qquad [\text{Math. 2}]$$

The maximum acceleration of the drone 10 moving along the connected route 47 is expressed by the following equation (3).

$$A = [ax, ay, az] \qquad [\text{Math. 3}]$$

The maximum deceleration of the drone 10 moving along the connected route 47 is expressed by the following equation (4).

$$D = [dx, dy, dz] \qquad [\text{Math. 4}]$$

Here, the difference in velocity between the smoothing start point 65 and the smoothing end point 66 is given by the following equation (5).

$$\text{Diff}V = [\text{diff}X, \text{diff}Y, \text{diff}Z] = [vx2 - vx1, vy2 - vy1, vz2 - vz1] \qquad [\text{Math. 5}]$$

In each of the x-, y-, and z-axis directions, if the velocity difference is positive, the velocity difference is divided by the maximum acceleration. If the velocity difference is negative, the velocity difference is divided by the maximum deceleration. Thus, while the drone 10 moves between the smoothing start point 65 and the smoothing end point 66, the time required for the velocity of the drone 10 on each of the x-, y-, and z-axes at the smoothing start point 65 to reach the velocity of the drone 10 on each of the x-, y-, and z-axes at the smoothing end point 66 is obtained.

Here, the time until the velocity on each of the x-, y-, and z-axes at the smoothing start point 65 reaches the velocity on each of the x-, y-, and z-axes at the smoothing end point 66 is given by the following equation (6).

TimeDiff=Max(diffX/(ax(if diffX>=0) or dx(if diffX<0), diffY/(ax(if diffY>=0) or dy(if diffY<0), diffZ/(ax(if diffZ>=0) or dz(if diffZ<0),) [Math. 6]

Therefore, the time of each axis component for which the maximum value is calculated, among the x-, y-, and z-axis directions, indicates the time taken for the drone 10 to move from the smoothing start point 65 to the smoothing end point 66.

The time difference is obtained, and thus the velocity at a time between the smoothing start point 65 and the smoothing end point 66 is determined.

Here, certain coordinates of a certain time (t) of the drone 10 moving along the route between the smoothing start point 65 and the smoothing end point 66 are given by the following equation (7).

$$P(\text{time}=t)=[x(t),y(t),z(t)] \quad [\text{Math. 7}]$$

Further, the velocity at a certain time of the drone 10 moving between the smoothing start point 65 and the smoothing end point 66 is given by the following equation (8).

$$V(\text{time}=t)=[vx(t),vy(t),vz(t)] \quad [\text{Math. 8}]$$

By multiplying the velocity at a certain time by unit time, the distance after the unit time of the drone 10 is given by the following equation (9). In other words, by adding the coordinates of the drone 10 at time (t−1) and the velocity multiplied by unit time, the coordinates of the drone 10 at the time t are obtained.

$$[xt,yt,zt]=[x(t-1)+vx(t-1),y(t-1)+vy(t-1),z(t-1)+vz(t-1)] \quad [\text{Math. 9}]$$

The coordinates between a certain time and the next time are obtained by the above equation, and thus a route that complements a gap between the smoothed coordinates at the certain time and the coordinates at the next time is calculated.

Figure 12:
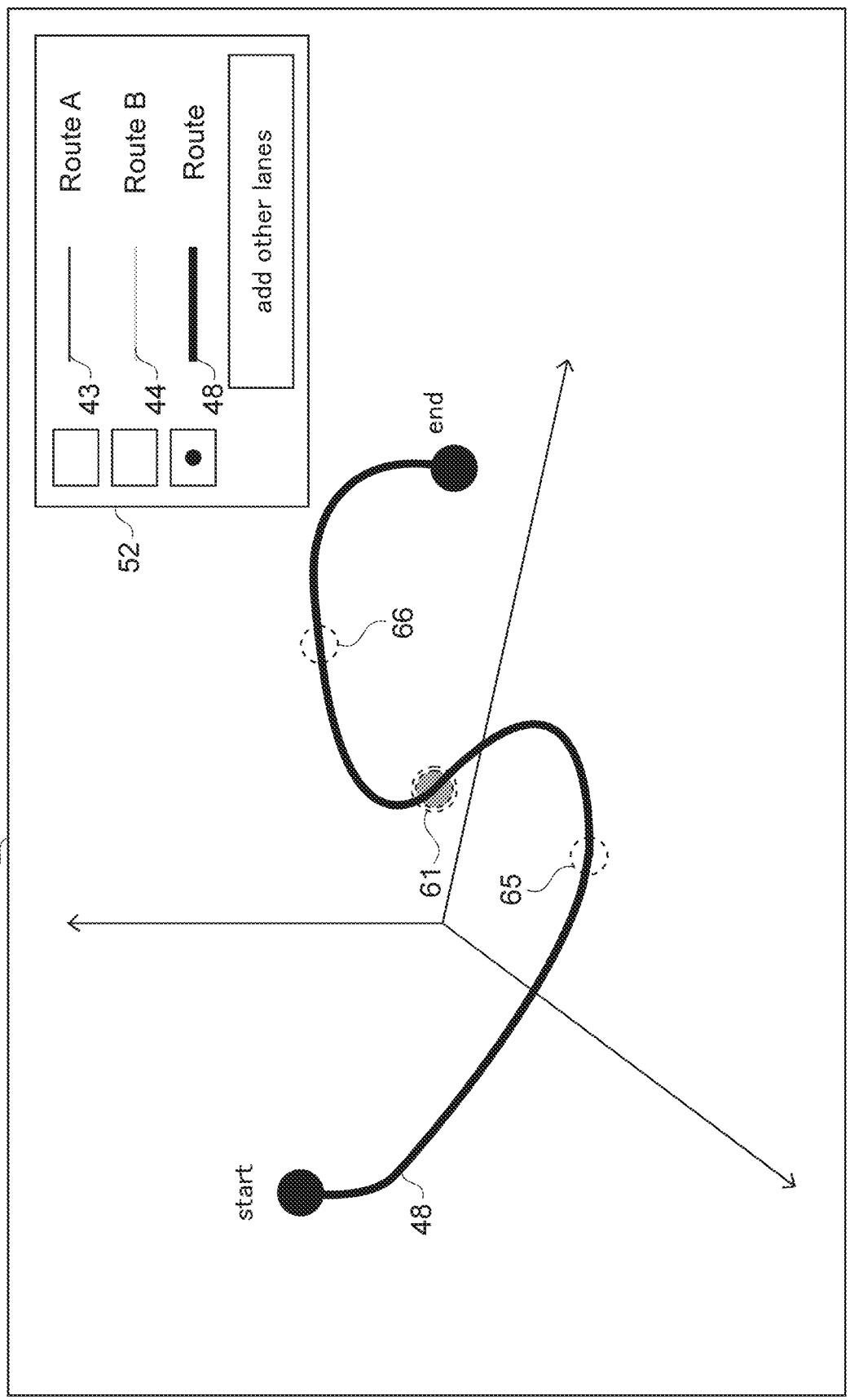
FIG. 12 is a schematic diagram showing a newly generated route.

FIG. 12 is a schematic diagram showing a newly generated route.

As a result, route information is generated, in which a route including the partial route A 45 and the partial route B 46 connected to each other and a state parameter including a result of smoothing are associated with each other, as shown in FIG. 12.

Note that the calculation method for performing smoothing is not limited. For example, in the calculation method for smoothing described above, the smoothing is performed to obtain the shortest time difference using the maximum acceleration or maximum deceleration. Other than this, it is possible to smoothly change the acceleration itself of the drone 10. In this case, the time of movement of the drone 10 is extended, and the distance of the route (the flight distance of the drone 10) is increased.

In addition to the above, whether to perform smoothing or not may be determined on the basis of the difference between the route directions of the partial route A 45 and partial route B 46 connected to each other. For example, it is assumed that the route direction of the partial route A 45 is oriented in the x-axis direction ([1, 0, 0]). If the route direction of the partial route B 46 is oriented in the same x-axis direction ([1, 0, 0]), the route analysis unit 36 may determine that smoothing at the connected point 61 is not necessary.

Conversely, for example, if the route direction of the partial route B 46 is largely different from the route direction of the partial route A 45, such as [−1, 0, 0.5], the route analysis unit 36 may determine that smoothing at the connected point 61 is necessary. In other words, the smoothing may be performed in the case where the route direction at the connected point of one of the routes to be connected is set as a reference and a route having an angle equal to or larger than a predetermined threshold from the reference direction.

Further, the same calculation method for smoothing has been used for all the x-, y-, and z-directions in the above description. The present technology is not limited to the above, and different calculation methods for smoothing may be performed for each axis (direction). Those smoothing methods may also be presented to the user 1 in a selectable manner.

As shown in FIG. 11, when the smoothing start point 65 and the smoothing end point 66 are selected by the user 1, the route editing unit 35 presents notification information 68, which indicates a notification of whether to execute smoothing or not, to the user 1. If the user 1 selects the notification information 68 or inputs a specific instruction such as a hot key, the route information generation unit 37 generates route information in which a route 48 including the partial route A 45 and the partial route B 46 connected to each other and a state parameter including the result of the smoothing are associated with each other.

As shown in FIG. 12, the route 48 included in the new route information generated by the route information generation unit 37 is displayed in the route display part 51 (Step 107). If the generated route 48 is a route desired by the user 1 (YES in Step 108), the route information including the route 48 is transmitted by the user 1 to the drone 10. As a result, the drone 1 performs autonomous flight in accordance with the route information desired by the user 1. If the generated route 48 is an undesired route by the user 1, the processing returns to the processing of selecting the smoothing start point 65 and the smoothing end point 66 (Step 105) shown in FIG. 11 (NO in Step 108).

Note that in this embodiment the smoothing method is not limited. For example, smoothing may be performed at the connected point 61. For example, the route editing unit 35 smooths the difference between the state parameter associated with the end point of the partial route B 46 and the state parameter associated with the start point of the partial route A 45.

This smoothing corresponds to smoothing in the case where the end point of the partial route B 46 is set as the smoothing start point 65 and the start point of the partial route A 45 is set as the smoothing end point 66. In such smoothing, there is a possibility that a sudden change may occur in the state parameter such as a velocity when the drone moves through the connected point 61.

On the other hand, the smoothing start point 65 is set at a position different from the connected point 61 on the partial route B 46. Further, the smoothing end point 66 is set at a position different from the connected point 61 on the partial route A 45. In other words, the smoothing region 67 is set as a range for predetermined smoothing.

This makes it possible to suppress a sudden change in the state parameter such as a velocity and to smoothly move from the partial route B 46 to the partial route A 45.

Note that, if the smoothing start point 65 and the smoothing end point 66 are set at positions different from the connected point 61, the connected route 47 that does not pass through the connected point 61 may be generated as a result of smoothing.

On the other hand, if the connected point 61 is set to at least one of the smoothing start point 65 or the smoothing end point 66, the connected route 47 passing through the connected point 61 can be generated. The smoothing start point 65 and the smoothing end point 66 may be set on the basis of such a viewpoint.

As described above, in the route editing system 100 according to this embodiment, the route information including a route including a plurality of positions and a state parameter relating to the moving state of the drone 10 when moving along a route associated with each position of the route is acquired. The first route (partial route B 46) included in the acquired first route information and the second route (partial route A 45) included in the acquired second route information are connected to each other. The difference between the first state parameter associated with the first smoothing point on the first route and the second state parameter associated with the second smoothing point on the second route is smoothed. As a result, it is possible to easily create a route for a mobile body capable of autonomously moving.

In the drone, the user does not operate the drone by using a stick or the like provided to a remote controller, but specifies a flight route including a time stamp, a position, a velocity, and the like, thus achieving fine drone flight. Such flight according to the specified flight route allows the drone to fly on the same flight route many times and releases the user from the operation of the drone. This provides an advantage of allowing the user to concentrate on other operations such as imaging.

Further, the flight route includes more detailed information than a route in which a via point called a waypoint is specified, and it is possible to achieve a fine and complicated flight way that can be a professional acrobatic performance, not simple and monotonous flight. The flight route can be created by actually causing the drone to fly and storing the flight data at that time.

If it is desired to fly a drone along a changed route different from the original route by using the flight route thus created, the edit of the flight route is required. However, a simple cut and paste of a route may create a route along which the drone does not fly. For example, when the endpoints of routes are connected to each other and if the velocity of the drone at one endpoint is 10 m/s, and the velocity of the drone at the other endpoint is at 30 m/s, such acceleration at the connection point is practically impossible, and what will happen at that point depends on how the error handling of the drone is performed.

In this regard, in the present technology, when two routes are connected to each other, the route information around the connected point is smoothed such that the drone can actually fly. As a result, it is possible to combine various flight routes to connect as many routes as possible, and it is possible to reuse the detailed flight routes.

Second Embodiment

A route editing system 200 according to a second embodiment of the present technology will be described. In the following description, descriptions of a configuration and an operation similar to those of the route editing system 100 described in the above embodiment will be omitted or simplified.

In the first embodiment, the route analysis unit 36 determines whether or not smoothing is necessary for the connected route including the first route and the second route connected to each other. In the second embodiment, the easiness of connection with another route is determined for each position of the route included in the route information acquired by the user 1.

Figure 13:
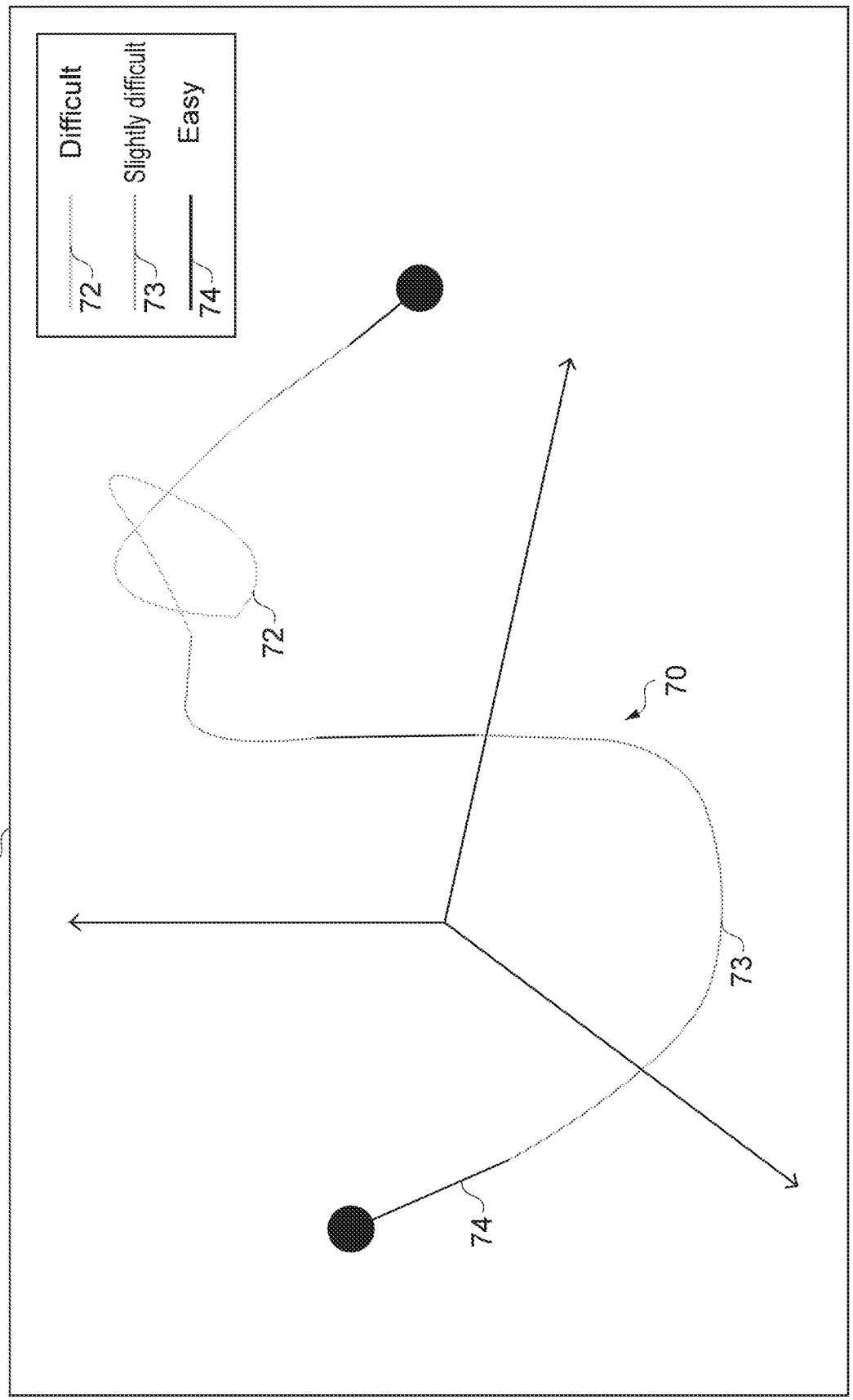
FIG. 13 is a schematic diagram of a route editing GUI according to a second embodiment.

FIG. 13 is a schematic diagram of a route editing GUI 50 according to the second embodiment of the present technology.

As shown in FIG. 13, a route 70 included in the route information acquired by the user 1 is displayed in a route display part 51. Further, the route editing GUI 50 includes the route display part 51 and a determination display part 71.

The determination display part 71 displays the determination result determined by the route analysis unit 36. In this embodiment, the easiness of connection of the route 70 is classified into three types of "difficult (route 72)", "slightly difficult (route 73)", and "easy (route 74)".

The route analysis unit 36 determines the easiness of connection with another route for each position of the route 70 included in the route information acquired by the user 1. In this embodiment, the easiness of connection with another route is determined by the route analysis unit 36 on the basis of the state parameter included in the acquired route information.

Typically, the easiness of connection is determined to be "difficult" at a position where the velocity of the drone 10 is fast. Further, the easiness of connection is determined to be "easy" at a position where the velocity of the drone 10 is slow. Needless to say, the method of determining the easiness of connection is not limited.

For example, if there are many positions at which the velocity of the drone 10 is fast, it may be determined that the connection is easy even at a point at which the velocity is fast. Further, for example, the distribution of the velocity of the drone 10 in the xy-axis (horizontal) direction and the z-axis (perpendicular) direction may be analyzed to determine the average velocity and the deviation at each position. If the deviation is equal to or larger than a threshold value, the easiness of connection may be determined to be "difficult". Conversely, if the deviation is equal to or less than the threshold value, the easiness of connection may be determined to be "easy". Further, the present technology is not limited to the velocity, and the easiness of connection may be determined using the posture or the like of the drone.

Further, the easiness of connection at each position of the route 70 is displayed in the route display part 51 such that the user 1 can distinguish the easiness. In this embodiment, the easiness of connection is displayed in different colors for each position of the route 70 respectively corresponding to "difficult", "slightly difficult", and "easy". Note that the distinguishable display method is not limited, and any method such as a method of adding another image such as the thickness of each position of the route 70, an arrow, or a frame, or display with a highlight may be employed.

Other Embodiments

The present technology is not limited to the embodiments described above, and can achieve various other embodiments.

In the first embodiment described above, the route and the axes of the orthogonal coordinates are displayed in the route display part 51. The present technology is not limited to this, and any display of environment information indicating the environment around the route or the like may be output to the route display part 51. For example, map information, obstacles, and the like around the route may be displayed in the route display part 51. The server apparatus 30 may also include an environment information DB for storing environment information for such a purpose. Further, the environment information DB may be managed by the management unit 38.

If the server apparatus 30 includes the environment information DB, the route analysis unit 36 is also capable of determining that flight is impossible due to an obstacle in movement along a route or edit of a route. Further, when the connected route is smoothed, the route editing unit 35 is also capable of providing a route that avoids an obstacle as a candidate.

Further, if the position coordinates of an imaging target have been set as the environmental information by the route analysis unit 36, it may be determined whether or not an obstacle that interferes with imaging is located between the position where the imaging of the drone 10 is performed and the position coordinates of the imaging target.

For example, it is assumed that the user 1 flies the drone 10 on a route along which an artist is to be imaged at a certain concert venue A. In addition, it is assumed that an artist is to be imaged at another concert venue B along substantially the same route as that used in the concert venue A. However, the ceiling of the concert venue B is lower than that of the concert venue A, and if the drone 10 flies on the same route, it will hit the ceiling. In this case, the user 1 performs route edit in which a part of the route used in the concert venue A is cut, the height of the route is lowered, and the route is connected to another return route. At that time, since a change in the velocity between the endpoints of the routes may be impracticable, the user 1 uses the route editing system 100 to smooth the route.

In the first embodiment described above, the route information is generated before the drone 10 starts flight. The present technology is not limited to the above, and a new route may be selected during the flight of the drone 10. In this case, the route along which the drone 10 is currently flying and a newly selected route are smoothed, thus achieving the flight.

Further, in the first embodiment described above, the smoothing start point 65 and the smoothing end point 66 are selected, and the smoothing region is set. The present technology is not limited to the above, and it is also possible to set the smoothing region 67 without selecting the smoothing start point 65 and the smoothing end point 66 by the user 1. In this case, the smoothing region is set using a predetermined width including the connected point 61, for example.

In the first and second embodiments described above, smoothing is performed for each position of the smoothing region 67 or the route 70. The present technology is not limited to the above, and smoothing of the endpoints for connection with another route may be performed on at least one of a start point or an end point of the route.

For example, the server apparatus 30 may include an endpoint smoothing unit that performs smoothing of endpoints. The endpoint smoothing unit performs smoothing on at least one of a start point or an end point. For example, the endpoint smoothing unit may smooth the difference between the state parameter at an endpoint, which is either a start point or an end point, and the state parameter at the position set with reference to the endpoint. Further, the route editing unit 35 may perform the endpoint smoothing.

Since the endpoints are smoothed in advance, it is easy to connect routes to each other. In addition, connection between routes is made possible without performing smoothing.

The endpoint smoothing performed on endpoints also includes connecting a connection route to an endpoint. The connection route is a route that can be easily connected to another route or to another connection route. For example, the connection route may be a straight route, a route to fly on a circular route having a radius of a certain distance, or the like. Alternatively, the connection route may be a route with a gradual change of the state parameter, such as a constant velocity, of the drone 10, or the like.

In the first and second embodiments described above, the difference between the state parameters of the two routes included in the route information is smoothed on the basis of the information regarding the connected point 61 at which the partial route A 45 and the partial route B 46 are connected to each other. The present technology is not limited to the above, and the difference between the state parameters of the start point and the end point of the connected route 47 may be smoothed. In other words, the start point may be selected as the smoothing start point 65, and the end point may be selected as the smoothing end point 66.

In the first and second embodiments described above, the calculation method for smoothing is calculated from the difference in velocity. The present technology is not limited to the above, and the calculation for smoothing may be performed on the basis of the posture of the drone 10, the angular velocity of the airframe performance, and the like.

Further, the smoothing method is not limited. For example, the smoothing may also include generating route information of straight flight around the endpoint at a constant velocity. For example, the smoothing may also include providing a route of flight over a circle radius of a certain distance. In other words, the smoothing can make the difference (change) of the state parameters included in the route information constant. The smoothing can also be processing of making it easier to connect a route to another route. Further, a plurality of methods for the candidate for smoothing as described above is provided, and thus the user 1 may be capable of selecting a candidate for smoothing.

Note that, when smoothing is performed, the connected point 61 may deviate from the route 48. In this case, smoothing may be performed so as to pass through the connected point 61 without fail. For example, the connected point 61 may be set to either the smoothing start point 65 or the smoothing end point 66. As a result, the route 48 is generated so as to pass through the connected point 61 without fail. Also, the route 48 that does not pass through the connected point 61 may be generated.

Further, when smoothing is performed, the distance of the route 48 (the flight distance of the drone 10) may be longer than the connected route 47. In this case, smoothing may be performed such that the route 48 does not exceed a predetermined distance such as the maximum flight time of the drone 10.

In the first and second embodiments described above, the two routes included in the two pieces of route information are connected to each other and smoothed. The present technology is not limited to the above, and smoothing may be performed when the two flight patterns of the drone 10 are connected to each other. For example, if the drone 10 moves so as to draw a figure eight after turning at a predetermined position, a route smoothed such that the drone 10 can fly from the "turning" to the "figure eight" may be generated. In other words, the smoothing includes editing the route such that the drone 10 can fly when the routes of the flight patterns are connected to each other or the predetermined route and the flight pattern are connected to each other.

The drone 10 may also have a moving mechanism that is movable over the ground, over water, or under water, as well as aerial flight. In other words, the present technology can be applied to a mobile body that is movable in various spaces such as a car, a ship, and a submarine in addition to the drone 10.

FIG. 14 is a block diagram showing a hardware configuration example of the server apparatus 30.

The server apparatus 30 includes a CPU 201, a read only memory (ROM) 202, a RAM 203, an input/output interface 205, and a bus 204 that connects them to each other. A display unit 206, an input unit 207, a storage unit 208, a communication unit 209, a drive unit 210, and the like are connected to the input/output interface 205.

The display unit 206 is a display device using liquid crystal, electro-luminescence (EL), or the like. The input unit 207 is, for example, a keyboard, a pointing device, a touch panel, or other operation devices. If the input unit 207 includes a touch panel, the touch panel may be integrated with the display unit 206.

The storage unit 208 is a nonvolatile storage device and is, for example, an HDD, a flash memory, or other solid-state memory. The drive unit 210 is, for example, a device capable of driving a removable recording medium 211 such as an optical recording medium or a magnetic recording tape.

The communication unit 209 is a modem, a router, or other communication device that can be connected to a LAN, a WAN, or the like for communicating with other devices. The communication unit 209 may communicate using either wired or wireless communication. The communication unit 209 is often used separately from the server apparatus 30.

In this embodiment, the communication unit 209 allows communication with other devices via the network.

The information processing by the server apparatus 30 having the above-mentioned hardware configuration is implemented in cooperation with the software stored in the storage unit 208, the ROM 202, or the like and the hardware resources of the server apparatus 30. Specifically, the information processing method according to the present technology is implemented when a program stored in the ROM 202 or the like and configuring the software is loaded into the RAM 203 and then executed.

The program is installed in the server apparatus 30, for example, through the recording medium 211. Alternatively, the program may be installed in the server apparatus 30 via a global network or the like. Moreover, any non-transitory computer-readable storage medium may be used.

The information processing apparatus, the information processing method, the program, and the information processing system according to the present technology may be performed, and the information processing apparatus according to the present technology may be constructed, by linking a computer mounted on a communication terminal with another computer capable of communicating via a network or the like.

In other words, the information processing apparatus, the information processing method, the program, and the information processing system according to the present technology can be performed not only in a computer system formed of a single computer, but also in a computer system in which a plurality of computers operates cooperatively. Note that, in the present disclosure, the system refers to a set of components (such as apparatuses and modules (parts)) and it does not matter whether all of the components are in a single housing. Thus, a plurality of apparatuses accommodated in separate housings and connected to each other through a network, and a single apparatus in which a plurality of modules is accommodated in a single housing are both the system.

The execution of the information processing apparatus, the information processing method, the program, and the information processing system according to the present technology by the computer system includes, for example, both a case in which the edit of a route, the determination of smoothing, and the generation of route information, and the like are performed by a single computer; and a case in which the respective processes are performed by different computers. Further, the execution of each process by a predetermined computer includes causing another computer to perform a portion of or all of the process and obtaining a result thereof.

In other words, the information processing apparatus, the information processing method, the program, and the information processing system according to the present technology are also applicable to a configuration of cloud computing in which a single function is shared and cooperatively processed by a plurality of apparatuses through a network.

The respective configurations of the GUI generation unit, the route editing unit, the route analysis unit, the route information generation unit, and the like; the control flow of the communication system; and the like described with reference to the respective figures are merely embodiments, and any modifications may be made thereto without departing from the spirit of the present technology. In other words, for example, any other configurations or algorithms for purpose of practicing the present technology may be adopted.

Note that the effects described in the present disclosure are merely illustrative and not restrictive, and other effects may be obtained. The above description of the plurality of effects does not necessarily mean that these effects are simultaneously exhibited. It means that at least one of the above-mentioned effects can be obtained depending on the conditions and the like, and of course, there is a possibility that an effect not described in the present disclosure can be exhibited.

At least two of the features among the features of the embodiments described above can also be combined. In other words, various features described in the respective embodiments may be combined discretionarily regardless of the embodiments.

Note that the present technology may also take the following configurations.

(1) An information processing apparatus, including:

an acquisition unit that acquires route information, the route information including a route including a plurality of positions and a state parameter relating to a moving state of a mobile body when the mobile body moves along the route, the state parameter being associated with each of the positions of the route;

a connection unit that connects a first route included in acquired first route information and a second route included in acquired second route information to each other; and a smoothing unit that smooths a difference between a first state parameter associated with a first smoothing point on the first route and a second state parameter associated with a second smoothing point on the second route.

(2) The information processing apparatus according to (1), in which the smoothing unit sets the first smoothing point and the second smoothing point with reference to a connected point at which the first route and the second route are connected to each other.

(3) The information processing apparatus according to (2), in which
the smoothing unit sets the connected point to at least one of the first smoothing point or the second smoothing point.
(4) The information processing apparatus according to any one of (1) to (3), further including
a generation unit that generates route information in which a route and a state parameter are associated with each other, the route including the first route and the second route connected to each other, the state parameter including a result of the smoothing.
(5) The information processing apparatus according to any one of (1) to (4), in which
the state parameter relating to the moving state of the mobile body includes a velocity of the mobile body and a posture of the mobile body.
(6) The information processing apparatus according to (1) or (5), in which
the acquisition unit acquires performance information relating to performance of the mobile body, and
the smoothing unit smooths the difference between the first state parameter and the second state parameter on the basis of the acquired performance information.
(7) The information processing apparatus according to (6), in which
the performance information includes at least one of a maximum velocity of the mobile body, a maximum acceleration of the mobile body, a maximum deceleration of the mobile body, or a maximum angular velocity of the mobile body.
(8) The information processing apparatus according to any one of (1) to (7), further including
a smoothing determination unit that determines whether or not the difference between the first state parameter and the second state parameter is to be smoothed.
(9) The information processing apparatus according to (8), in which
the connection unit connects an end point of the first route and a start point of the second route to each other, and
the smoothing determination unit determines whether or not the difference between the first state parameter and the second state parameter is to be smoothed on the basis of a difference between the state parameter associated with the end point of the first route and the state parameter associated with the start point of the second route.
(10) The information processing apparatus according to (8) or (9), in which
the acquisition unit acquires performance information relating to moving performance of the mobile body, and
the smoothing determination unit determines whether or not the difference between the first state parameter and the second state parameter is to be smoothed on the basis of the acquired performance information.
(11) The information processing apparatus according to any one of (1) to (10), further including
a connection determination unit that determines easiness of connection with another route for each of the positions of the route included in the acquired route information.
(12) The information processing apparatus according to (11), in which
the connection determination unit determines the easiness of connection with the other route on the basis of the state parameter included in the acquired route information.
(13) The information processing apparatus according to any one of (1) to (12), further including a GUI generation unit that generates a graphical user interface (GUI) for inputting an instruction relating to connection of the route included in the route information.
(14) The information processing apparatus according to (13), in which
the instruction relating to connection of the route includes an instruction to cut out a part of the route included in the route information, an instruction to duplicate the route or a part of the route, an instruction to connect the first route and the second route to each other, an instruction to set the first smoothing point and the second smoothing point, and an instruction to perform smoothing.
(15) The information processing apparatus according to (13) or (14), further including
a connection determination unit that determines easiness of connection with another route for each of the positions of the route included in the acquired route information, in which
the GUI generation unit generates the GUI including the route, in which a result of the determination by the connection determination unit is displayed in a distinguishable manner.
(16) The information processing apparatus according to any one of (1) to (15), further including
an endpoint smoothing unit that performs endpoint smoothing for connection with another route on at least one of a start point or an end point of the route included in the acquired route information.
(17) The information processing apparatus according to (16), in which
the endpoint smoothing unit smooths a difference between the state parameter at an endpoint that is the start point or the end point and the state parameter at a position set with reference to the endpoint.
(18) An information processing method, which is executed by a computer system, the method including:
acquiring route information, the route information including a route including a plurality of positions and a state parameter relating to a moving state of a mobile body when the mobile body moves along the route, the state parameter being associated with each of the positions of the route;
connecting a first route included in acquired first route information and a second route included in acquired second route information to each other; and
smoothing a difference between a first state parameter associated with a first smoothing point on the first route and a second state parameter associated with a second smoothing point on the second route.
(19) A program causing a computer system to execute the steps of:
acquiring route information, the route information including a route including a plurality of positions and a state parameter relating to a moving state of a mobile body when the mobile body moves along the route, the state parameter being associated with each of the positions of the route;
connecting a first route included in acquired first route information and a second route included in acquired second route information to each other; and
smoothing a difference between a first state parameter associated with a first smoothing point on the first route and a second state parameter associated with a second smoothing point on the second route.
(20) An information processing system, including:
an information processing apparatus including
an acquisition unit that acquires route information, the route information including a route including a plurality of positions and a state parameter relating to a moving state of a mobile body when the mobile body moves along the route, the state parameter being associated with each of the positions of the route, a connection unit that connects a first route included in acquired first route information and a second route included in acquired second route information to each other, a smoothing unit that smooths a difference between a first state parameter associated with a first smoothing point on the first route and a second state parameter associated with a second smoothing point on the second route, and a generation unit that generates route information in which a route and a state parameter are associated with each other, the route including the first route and the second route connected to each other, the state parameter including a result of the smoothing; and a mobile body movable on the basis of the route information generated by the generation unit.

REFERENCE SIGNS LIST 10 drone
30 server apparatus
34 GUI output unit
35 route editing unit
36 route analysis unit
37 route information generation unit
38 management unit
43 route A
44 route B
45 partial route A
46 partial route B
47 connected route
50 route editing GUI
61 connected point
65 smoothing start point
66 smoothing end point
100 route editing system

The invention claimed is:

1. An information processing apparatus, comprising:
circuitry configured to
acquire route information, the route information including one or more routes, each route of the one or more routes including a plurality of positions and a state parameter relating to a moving state of a mobile body when the mobile body moves along the route, the state parameter being associated with each of the positions of the route and including a velocity of the mobile body and a Posture of the mobile body in xyz coordinate,
determine easiness of connection with a first route for each of the positions of a second route based on at least one of the velocity of the mobile body and the posture of the mobile body, the first route and the second route being one of the one or more routes included in the route information,
output the easiness of connection of the first route and the second route via a graphical user interface (GUI),
connect the first route and the second route to each other, and
smooth a difference between a first state parameter associated with a first smoothing point on the first route and a second state parameter associated with a second smoothing point on the second route.

2. The information processing apparatus according to claim 1, wherein
the circuitry is configured to set the first smoothing point and the second smoothing point with reference to a connected point at which the first route and the second route are connected to each other.

3. The information processing apparatus according to claim 2, wherein
the circuitry is configured to set the connected point to at least one of the first smoothing point or the second smoothing point.

4. The information processing apparatus according to claim 1, wherein
the circuitry is configured to generate the route information in which each of the one or more routes and the state parameter are associated with each other, the one or more routes including the first route and the second route connected to each other, the state parameter including a result of the smoothing.

5. The information processing apparatus according to claim 1, wherein
the circuitry is configured to acquire performance information relating to performance of the mobile body, and
the circuitry is configured to smooth the difference between the first state parameter and the second state parameter on a basis of the acquired performance information.

6. The information processing apparatus according to claim 5, wherein
the performance information includes at least one of a maximum velocity of the mobile body, a maximum acceleration of the mobile body, a maximum deceleration of the mobile body, or a maximum angular velocity of the mobile body.

7. The information processing apparatus according to claim 1, wherein
the circuitry is configured to determine whether or not the difference between the first state parameter and the second state parameter is to be smoothed.

8. The information processing apparatus according to claim 7, wherein
the circuitry is configured to connect an end point of the first route and a start point of the second route to each other, and
the circuitry is configured to determine whether or not the difference between the first state parameter and the second state parameter is to be smoothed on a basis of a difference between the state parameter associated with the end point of the first route and the state parameter associated with the start point of the second route.

9. The information processing apparatus according to claim 7, wherein
the circuitry is configured to acquire performance information relating to moving performance of the mobile body, and
the circuitry is configured to determine whether or not the difference between the first state parameter and the second state parameter is to be smoothed on a basis of the acquired performance information.

10. The information processing apparatus according to claim 1, wherein
the circuitry is configured to generate the GUI for inputting an instruction relating to connection of the route included in the route information by a user.

11. The information processing apparatus according to claim 10, wherein
the instruction relating to connection of the route includes an instruction to cut out a part of the route included in the route information, an instruction to duplicate the route or a part of the route, an instruction to connect the first route and the second route to each other, an instruction to set the first smoothing point and the second smoothing point, and an instruction to perform smoothing.

12. The information processing apparatus according to claim 10, wherein
the circuitry is configured to generate the GUI including the route, in which a result of the determination of the easiness of connection is displayed in a distinguishable manner.

13. The information processing apparatus according to claim 1, wherein
the circuitry is configured to perform endpoint smoothing for connection with another route on at least one of a start point or an end point of the route included in the acquired route information.

14. The information processing apparatus according to claim 13, wherein
the circuitry is configured to smooth a difference between the state parameter at an endpoint that is the start point or the end point and the state parameter at a position set with reference to the endpoint.

15. An information processing method, which is executed by a computer system, the method comprising:
acquiring route information, the route information including one or more routes, each route of the one or more routes including a plurality of positions and a state parameter relating to a moving state of a mobile body when the mobile body moves along the route, the state parameter being associated with each of the positions of the route and including a velocity of the mobile body and a posture of the mobile body in xyz coordinate;
determining easiness of connection with a first route for each of the positions of a second route based on at least one of the velocity of the mobile body and the posture of the mobile body, the first route and the second route being one of the one or more routes included in the route information;
outputting the easiness of connection of the first route and the second route via a graphical user interface (GUI);
connecting the first route and the second route to each other; and
smoothing a difference between a first state parameter associated with a first smoothing point on the first route and a second state parameter associated with a second smoothing point on the second route.

16. A non-transitory computer-readable storage medium including computer executable instructions, wherein the instructions, when executed by a computer system, cause the computer system to perform a method, the method comprising:
acquiring route information, the route information including one or more routes, each route of the one or more routes including a plurality of positions and a state parameter relating to a moving state of a mobile body when the mobile body moves along the route, the state parameter being associated with each of the positions of the route and including a velocity of the mobile body and a posture of the mobile body in xyz coordinate;
determining easiness of connection with a first route for each of the positions of a second route based on at least one of the velocity of the mobile body and the posture of the mobile body, the first route and the second route being one of the one or more routes included in the route information;
outputting the easiness of connection of the first route and the second route via a graphical user interface (GUI);
connecting the first route and the second route to each other; and
smoothing a difference between a first state parameter associated with a first smoothing point on the first route and a second state parameter associated with a second smoothing point on the second route.

17. An information processing system, comprising:
an information processing apparatus including
circuitry configured to
acquire route information, the route information including one or more routes, each route of the one or more routes including a plurality of positions and a state parameter relating to a moving state of a mobile body when the mobile body moves along the route, the state parameter being associated with each of the positions of the route and including a velocity of the mobile body and a posture of the mobile body in xyz coordinate,
determine easiness of connection with a first route for each of the positions of a second route based on at least one of the velocity of the mobile body and the posture of the mobile body, the first route and the second route being one of the one or more routes included in the route information,
output the easiness of connection of the first route and the second route via a graphical user interface (GUI),
connect the first route and the second route to each other,
smooth a difference between a first state parameter associated with a first smoothing point on the first route and a second state parameter associated with a second smoothing point on the second route, and
generate route information in which each of the one or more routes and the state parameter are associated with each other, the one or more routes including the first route and the second route connected to each other, the state parameter including a result of the smoothing; and
a mobile body movable on a basis of the route information generated by the information processing apparatus.

18. The information processing apparatus according to claim 1, wherein
the circuitry is configured to determine the easiness of connection as difficult under condition that the velocity of the mobile body exceeds a predetermined threshold, and determine the easiness of connection as easy under condition that the velocity of the mobile body does not exceed the predetermined threshold.

19. The information processing apparatus according to claim 1, wherein
the circuitry is configured to analyze distribution of the velocity of the mobile body in a horizontal direction and in perpendicular direction to determine average velocity and deviation at each position of the plurality of positions in the one or more routes,
determine the easiness of connection as difficult under condition that the deviation exceeds a predetermined threshold, and determine the easiness of connection as easy under condition that the deviation does not exceed the predetermined threshold.

20. The information processing apparatus according to claim 12, wherein
the circuitry is configured to connect the first route and the second route to each other, in response to selection input via the GUI by the user.

* * * * *